(12) United States Patent
Hecht et al.

(10) Patent No.: US 10,678,380 B2
(45) Date of Patent: Jun. 9, 2020

(54) ACOUSTIC TOUCH APPARATUS AND METHOD USING TOUCH SENSITIVE LAMB WAVES

(71) Applicant: Elo Touch Solutions, Inc., Milpitas, CA (US)

(72) Inventors: David S. Hecht, San Carlos, CA (US); Daniel H. Scharff, San Leandro, CA (US); Joel C. Kent, Fremont, CA (US); Kyu-Tak Son, Mountain View, CA (US); Masao Takeuchi, Yokohama (JP)

(73) Assignee: ELO TOUCH SOLUTIONS, INC., Milpitas, CA (US)

( * ) Notice: Subject to any disclaimer, the term of this patent is extended or adjusted under 35 U.S.C. 154(b) by 99 days.

(21) Appl. No.: 15/349,852

(22) Filed: Nov. 11, 2016

(65) Prior Publication Data
US 2017/0115827 A1  Apr. 27, 2017

Related U.S. Application Data

(63) Continuation of application No. 13/873,007, filed on Apr. 29, 2013, now Pat. No. 9,507,464.

(60) Provisional application No. 61/790,777, filed on Mar. 15, 2013.

(51) Int. Cl.
*G06F 3/043* (2006.01)

(52) U.S. Cl.
CPC .................. *G06F 3/0436* (2013.01)

(58) Field of Classification Search
CPC ...................................... G06F 3/0436
See application file for complete search history.

(56) References Cited

U.S. PATENT DOCUMENTS

| | | | |
|---|---|---|---|
| 4,639,720 A | | 1/1987 | Rympalski et al. |
| 4,645,870 A | * | 2/1987 | Adler .................... G06F 3/0436 345/177 |
| 4,700,176 A | * | 10/1987 | Adler .................... G06F 3/0436 341/20 |

(Continued)

FOREIGN PATENT DOCUMENTS

| | | |
|---|---|---|
| CN | 1179845 A | 4/1998 |
| CN | 100437447 C | 11/2008 |

(Continued)

OTHER PUBLICATIONS

WIPO Application No. PCT/US2014/024739, PCT International Search Report and Written Opinion of the International Searching Authority, dated Jul. 21, 2014.

(Continued)

*Primary Examiner* — Grant Sitta
(74) *Attorney, Agent, or Firm* — Alston & Bird LLP

(57) ABSTRACT

Systems and related methods providing for touch sensors using high sensitivity Lamb waves are disclosed herein. A touch controller may comprise circuitry having operating frequency characteristics, including an operating frequency f and a frequency spread Δf; and circuitry configured to minimize effects of dispersion based upon at least one of selected operating frequency characteristics relative to a frequency dependence of a group velocity of propagating waves and a frequency dependent phase error, wherein the touch controller generates an excitation signal.

20 Claims, 23 Drawing Sheets

(56) References Cited

U.S. PATENT DOCUMENTS

| | | | |
|---|---|---|---|
| 4,746,914 A * | 5/1988 | Adler | G06F 3/0436 333/153 |
| 5,129,262 A | 7/1992 | White et al. | |
| 5,243,148 A | 9/1993 | Knowles | |
| 5,570,302 A * | 10/1996 | Kobayashi | G06F 3/0433 178/18.04 |
| 5,591,945 A | 1/1997 | Kent | |
| 5,751,703 A * | 5/1998 | Kobayashi | H04B 7/2643 370/321 |
| 5,760,346 A * | 6/1998 | Kobayashi | G06F 3/0436 178/18.04 |
| 5,854,450 A | 12/1998 | Kent | |
| 5,886,452 A | 3/1999 | Toda | |
| 6,078,315 A | 6/2000 | Huang | |
| 6,087,599 A | 7/2000 | Knowles | |
| 6,091,406 A * | 7/2000 | Kambara | G06F 3/0436 178/18.04 |
| 6,121,856 A | 9/2000 | Apostolos | |
| 6,396,484 B1 * | 5/2002 | Adler | G06F 3/0436 345/173 |
| 6,420,816 B2 | 7/2002 | Getman et al. | |
| 6,473,075 B1 * | 10/2002 | Gomes | G06F 3/0418 178/18.04 |
| 6,492,979 B1 * | 12/2002 | Kent | G06F 3/0414 178/18.01 |
| 6,498,590 B1 | 12/2002 | Dietz et al. | |
| 6,630,929 B1 * | 10/2003 | Adler | G06F 3/0436 178/18.04 |
| 7,157,649 B2 * | 1/2007 | Hill | G06F 3/0433 178/18.01 |
| 7,315,300 B2 * | 1/2008 | Hill | G06F 3/0433 178/18.01 |
| 7,376,523 B2 * | 5/2008 | Sullivan | G06F 3/0418 702/150 |
| 7,499,039 B2 * | 3/2009 | Roberts | G06F 3/0436 178/18.01 |
| 7,511,711 B2 | 3/2009 | Ing et al. | |
| 7,683,890 B2 * | 3/2010 | Geaghan | G06F 3/041 178/18.01 |
| 7,982,724 B2 * | 7/2011 | Hill | G06F 3/0433 178/18.04 |
| 7,986,193 B2 * | 7/2011 | Krah | G06F 3/0418 331/17 |
| 8,059,107 B2 * | 11/2011 | Hill | G06F 3/0436 178/18.04 |
| 8,077,159 B2 * | 12/2011 | St. Pierre | G06F 3/043 178/18.01 |
| 8,125,429 B2 | 2/2012 | Yamazaki et al. | |
| 8,156,809 B2 * | 4/2012 | Tierling | G06F 3/016 73/579 |
| 8,217,917 B2 * | 7/2012 | Hill | G06F 3/0436 178/18.04 |
| 8,274,480 B2 * | 9/2012 | Sullivan | G06F 3/0436 345/173 |
| 8,325,160 B2 * | 12/2012 | St. Pierre | G06F 3/0436 178/18.01 |
| 8,830,211 B2 * | 9/2014 | Hill | G06F 3/0433 178/18.04 |
| 9,261,486 B2 | 2/2016 | Balasubramaniam et al. | |
| 9,507,464 B2 | 11/2016 | Hecht et al. | |
| 2001/0006006 A1 * | 7/2001 | Hill | G06F 3/0433 73/606 |
| 2002/0104691 A1 * | 8/2002 | Kent | G06F 3/043 178/18.04 |
| 2002/0167862 A1 * | 11/2002 | Tomasi | G01S 5/18 367/118 |
| 2003/0066692 A1 * | 4/2003 | Devige | G06F 3/0433 178/18.04 |
| 2005/0146513 A1 * | 7/2005 | Hill | G06F 3/0436 345/173 |
| 2005/0243071 A1 | 11/2005 | Kent et al. | |
| 2010/0117993 A1 * | 5/2010 | Kent | G06F 3/0418 345/177 |
| 2011/0234545 A1 | 9/2011 | Tanaka et al. | |
| 2011/0254812 A1 | 10/2011 | Kent et al. | |
| 2012/0182269 A1 | 7/2012 | Kent et al. | |
| 2012/0278031 A1 | 11/2012 | Oda et al. | |

FOREIGN PATENT DOCUMENTS

| | | |
|---|---|---|
| WO | WO 2008/135846 A1 | 11/2008 |
| WO | WO 2014/151001 A1 | 9/2014 |

OTHER PUBLICATIONS

WIPO Application No. PCT/US2014/024739, PCT International Preliminary Report on Patentability, dated Sep. 15, 2015.
EPO Application No. EP14770654, Supplementary European Search Report, dated Sep. 30, 2016.
U.S. Appl. No. 13/873,007, Non-Final Office Action dated Feb. 5, 2015.
U.S. Appl. No. 13/873,007, Applicant-Initiated Interview Summary, dated May 22, 2015.
U.S. Appl. No. 13/873,007, Non-Final Office Action dated Sep. 14, 2015.
U.S. Appl. No. 13/873,007, Applicant-Initiated Interview Summary, dated Dec. 24, 2015.
U.S. Appl. No. 13/873,007, Final Office Action dated Apr. 11, 2016.
U.S. Appl. No. 13/873,007, Notice of Allowance dated Jul. 22, 2016.
U.S. Appl. No. 13/873,007, Applicant-Initiated Interview Summary, dated Jul. 22, 2016.

* cited by examiner

500

| n = | 0 | 1 | 2 | 3 | 4 | 5 | 6 | 7 | 8 |
|---|---|---|---|---|---|---|---|---|---|
| Sn | 0.000 (SAW) | 0.542 | 0.615 (SH2) | 1.230 (SH4) | 1.627 | 1.844 (SH6) | 2.459 (SH8) | 2.712 | 3.074 (SH10) |
| An | 0.000 (SAW) | 0.307 (SH1) | 0.922 (SH3) | 1.085 | 1.537 (SH5) | 2.152 (SH7) | 2.170 | 2.767 (SH9) | 3.255 |

| n = | 0 | 1 | 2 | 3 | 4 | 5 | 6 | 7 | 8 |
|---|---|---|---|---|---|---|---|---|---|
| Sn | 0.000 (SAW) | 0.504 | 0.611 (SH2) | 1.221 (SH4) | 1.511 | 1.832 (SH6) | 2.443 (SH8) | 2.520 | 3.053 (SH10) |
| An | 0.000 (SAW) | 0.305 (SH1) | 0.916 (SH3) | 1.008 | 1.527 (SH5) | 2.016 | 2.137 (SH7) | 2.748 (SH9) | 3.023 |

| n= | 0 | 1 | 2 | 3 | 4 | 5 | 6 | 7 | 8 |
|---|---|---|---|---|---|---|---|---|---|
| Sn | 0.00 (SAW) | 3.00 | 3.40 (SH2) | 6.80 (SH4) | 9.00 | 10.20 (SH6) | 13.60 (SH8) | 15.00 | 17.00 (SH10) |
| An | 0.00 (SAW) | 1.70 (SH1) | 5.10 (SH3) | 6.00 | 8.50 (SH5) | 11.90 (SH7) | 12.00 | 15.30 (SH9) | 18.00 |

| Mode | S0/ Lamé | A1/ Lamé | S1/ Lamé | A2/ Lamé | S2/ Lamé |
|---|---|---|---|---|---|
| Relative Touch Sensitivity | 0.88 (1.37) | 0.45 (0.41) | 0.30 (0.29) | 0.22 (0.22) | 0.18 (0.19) |

ACOUSTIC TOUCH APPARATUS AND METHOD USING TOUCH SENSITIVE LAMB WAVES

CROSS REFERENCE TO RELATED APPLICATIONS

The present application is a continuation of U.S. patent application Ser. No. 13/873,007, titled, "Acoustic Touch Apparatus and Methods Using Touch Sensitive Lamb Waves," filed Apr. 29, 2013, which claims the benefit of U.S. Provisional Application No. 61/790,777, titled, "Acoustic Touch Apparatus and Methods Using Touch Sensitive Lamb Waves," filed Mar. 15, 2013, the contents of which are hereby incorporated herein by reference in their entirety.

FIELD

Embodiments discussed herein are related to, in general, touch sensors using Lamb waves to detect a touch event and a location of a touch.

BACKGROUND

Touch sensor systems, such as those used with display screens to form touch displays, may act as input devices for interactive computer systems. Such systems may also be used for applications such as information kiosks, computers, order entry systems for restaurants, video displays or signage, mobile devices, etc. By integrating a touch sensor system into a computing device, the computer may provide a user an intuitive, interactive human-machine-interface.

Commercially, the cosmetic look and industrial design of touch devices as well as the cost, robustness, and reliability of such devices is becoming increasingly important. However, the components, physics, and other scientific principles that are leveraged to provide such functionality often inhibit or even degrade certain features and combinations of features that are desirable.

BRIEF SUMMARY

Through applied effort, ingenuity, and innovation taking advantage of an unexpected result, many identified problems of existing touch sensor systems have been solved by developing solutions that are included in embodiments of the present invention, some examples of which are described herein.

Systems, apparatus and related methods are provided to, in general, enable touch sensors using high sensitivity Lamb waves. In one exemplary example, a transmitting transducer mounted on the back of a substrate may be excited to generate a (transmit) surface acoustic wave signal coupled to the back surface of the substrate. A mode conversion array on the back of the substrate may be configured to coherently scatter the surface acoustic wave into a near-longitudinal-resonance Lamb wave that propagates through a touch region (e.g., of the front surface) of the substrate where a user may touch the substrate and, thereby interact with the touch sensor system and impact change in a connected computer system. A second mode conversion array on the back of the substrate may be configured to convert the near-longitudinal-resonance Lamb wave, or the resulting near-longitudinal-resonance Lamb wave in the event of a touch event, into a (return) surface acoustic wave that is coupled to the back of the substrate and may be detected by a receiving transducer mounted on the back of the substrate. The signal received by the receiving transducer may be provided to a processing device for detection of a touch event and a location of a touch, which information may be used by the connected computer system.

For example, some embodiments may include a touch apparatus comprising a substrate. The substrate may have a front surface with a touch region and a back surface. The touch apparatus may be configured to propagate surface acoustic waves on at least a portion of the back surface and near-longitudinal-resonance Lamb waves in at least a portion of the touch region of the substrate.

In some embodiments, the near-longitudinal-resonance Lamb waves may propagate through the touch region with a phase velocity $V_P$, the surface acoustic waves may propagate on the back surface with a velocity $V_{SAW}$, and $V_P$ may be at least about three times $V_{SAW}$. In some embodiments, the near-longitudinal-resonance Lamb waves may propagate through the touch region at an operating frequency $f$; the substrate may have a bulk pressure wave velocity $V_{LONG}$ and a thickness $d$, and $d$ may be greater than $(m/2)*(V_{LONG}/f)$ and less than $(5/4)\cdot(m/2)\cdot(V_{LONG}/f)$, where $m$ is a positive integer.

Some embodiments may provide for a touch apparatus that includes one or more mode conversion arrays. For example, a mode conversion array may be disposed on the back surface of the substrate outside of the touch region. The mode conversion array may be configured to coherently scatter a surface acoustic wave that propagates in a first direction along a length of the mode conversion array into a near-longitudinal-resonance Lamb wave that propagates in a second direction through the touch region.

In some embodiments, the mode conversion array may include multiple reflector elements disposed along the first direction. The multiple reflector elements may be formed from at least one of the group of glass frit, ceramic, loaded polymer, and etched grooves. In some embodiments, the near-longitudinal-resonance Lamb waves may propagate through the touch region with a phase velocity $V_P$; the surface acoustic waves may propagate on the back surface with velocity $V_{SAW}$; the first direction and the second direction may define a scattering angle $\Phi$; the mode conversion array may include multiple reflector elements disposed along the first direction, each reflector element of the multiple reflector elements disposed at a reflector angle $\theta$ relative to the first direction; and $\cos(\theta)/V_{SAW}=\cos(\theta-\Phi)/V_P$. In some embodiments, the near-longitudinal-resonance Lamb waves may propagate through the touch region at an operating frequency $f$; and a distance $S$ along the first direction between two consecutive reflector elements of the multiple reflector elements may be given by $S=n*(V_{SAW}/f)/(1-(V_{SAW}/V_P)*\cos(\Phi))$, where $n$ is an integer. For example, the scattering angle $\Phi$ may be 90°.

In some embodiments, the mode conversion array may be coupled to the back surface of the substrate via an acoustically beneficial layer configured to decrease surface acoustic wave oscillation from the back surface to the front surface of the substrate.

Some embodiments may provide for a touch sensor configured to minimize dispersion. For example, a touch sensor may include one or more transducers and a controller. The transducer be disposed on the back surface of the substrate and configured to generate surface acoustic waves. The controller may be configured generate an excitation signal having an operating frequency $f$ that drives the transducer. The excitation signal may include a frequency spread $\Delta f$ around the operating frequency $f$. The near-longitudinal-resonance Lamb waves may propagate through the touch region of the substrate at the operating frequency f with the frequency spread $\Delta f$.

In some embodiments, the controller may be further configured to anti-disperse the excitation signal with a frequency dependent phase error configured to compensate for dispersion of the near-longitudinal-resonance Lamb waves caused by propagation of the near-longitudinal-resonance Lamb waves through the substrate with the frequency spread $\Delta f$. For example, the near-longitudinal-resonance Lamb waves may propagate through the substrate with a group velocity $V^G_{LAMB}$ that varies with varying operating frequencies; and the operating frequency f may be near an inflection point of the group velocity $V^G_{LAMB}$ as a function of the varying frequencies. Additionally and/or alternatively, the group velocity $V^G_{LAMB}$ may have a low frequency dependence within the frequency spread $\Delta f$.

In some embodiments, the near-longitudinal-resonance Lamb waves may propagate a distance L through the touch region; the near-longitudinal-resonance Lamb waves may propagate with a group velocity $V^G_{LAMB}$; the surface acoustic waves may propagate on the back surface with velocity $V_{SAW}$; a touch on the front surface of the substrate in the touch region may define a distance $\Delta X$; and $(V_{SAW}/V^G_{LAMB}) * |d(\ln(V^G_{LAMB})/d(\ln(f))|$ may be less than or equal to $2*(\Delta X/L)/(f/\Delta f)$. In some embodiments, the near-longitudinal-resonance Lamb waves may propagate a distance L through the touch region; the near-longitudinal-resonance Lamb waves may propagate with a group velocity $V^G_{LAMB}$; the surface acoustic waves may propagate on the back surface with velocity $V_{SAW}$; and $(V_{SAW}/V^G_{LAMB})*|d(\ln(V^G_{LAMB})/d(\ln(f))|$ may be less than 4 or equal to 4.

In some embodiments, the substrate may have a thickness d; the touch apparatus may have an operating frequency f; and the substrate may be configured to propagate the near-longitudinal-resonance Lamb waves at a frequency-thickness product $f*d$ greater than 9.00 MegaHertz-millimeter and less than $(5/4)*9.00$ MegaHertz-millimeter.

Some embodiments may provide for a touch apparatus configured to facilitate bezel-less designs and other cosmetic advantages. For example, the touch apparatus may include mounting tape disposed on the back surface of the substrate that defines a mounting tape periphery region of the back surface of the substrate outside of the touch region of the front surface of the substrate. The mounting tape may be configured to protect at least one transducer and at least one mode conversion array disposed on the back surface within the mounting tape peripheral region from contaminants when the mounting tape is attached to a display device.

In some embodiments, a connecting portion of the substrate between the front surface and the back surface may be substantially planar. For example, the connecting portion may be flat. In other examples, the connecting portion may be virtually any shape and may be substantially non-planar.

In some embodiments, the touch apparatus may include a coversheet. The coversheet may be disposed at the front surface of the substrate and configured to receive a touch that attenuates the near-longitudinal-resonance lamb waves in at least the portion of the touch region of the substrate. In some embodiments, the coversheet may include a front surface, back surface, and an opaque coating disposed on the back surface, the opaque coating defining an opaque periphery region of the back surface of the coversheet; and a perimeter adhesive bonding material disposed between the front surface of the substrate and the opaque coating, the perimeter adhesive bonding configured to adhere the coversheet to the substrate.

In some embodiments, a perimeter edge of the substrate may be non-linear. For example, the perimeter edge may be curved, angled, or the like. In some embodiments, the touch apparatus may further include a graphic disposed on the back surface and/or front surface of the substrate outside of the touch region.

Some embodiments of the touch apparatus may provide redundant touch determination and/or characteristics of touch determination using high sensitivity Lamb waves. For example, the touch apparatus may be configured to propagate near-sheer-resonance Lamb waves in the touch region of the substrate. In some embodiments, the touch apparatus may further include a controller configured to redundantly determine a location of a touch within the touch region based on an electrical return signal that represents a first attenuation of the near-longitudinal-resonance Lamb waves and a second attenuation of the near-sheer-resonance Lamb waves in the touch region caused by the touch. For example, the controller may be configured to compare to compare a magnitude of the first attenuation with a magnitude of the second attenuation.

Some embodiments may provide for a method of detecting a location of touch on an acoustic touch apparatus. For example, the method may include: generating an electrical excitation signal; sending the electrical excitation signal to a transmitting transducer disposed on a back surface of a substrate, the transmitting transducer configured to transform the electrical excitation signal to an acoustic wave that couples to the substrate as a surface acoustic wave; receiving an electrical return signal from a receiving transducer disposed on the back surface of the substrate, the receiving transducer configured to transform the acoustic wave into the electrical return signal, wherein the electrical return signal represents the acoustic wave including an attenuation that occurs from a touch on a front surface of the substrate while propagating through a touch region of the substrate as a near-longitudinal-resonance Lamb wave; and determining a location of the touch based on the electrical return signal.

In some embodiments, the near-longitudinal-resonance Lamb wave may propagate through the touch region with a phase velocity $V_P$; the surface acoustic wave may propagate on the back surface with a velocity $V_{SAW}$; and $V_P$ may be at least about three times $V_{SAW}$. In some embodiments, generating the electrical excitation signal may include generating the electrical excitation signal with an operating frequency f; the near-longitudinal-resonance Lamb wave may propagate through the touch region at the operating frequency f; the substrate may have a bulk pressure wave velocity $V_{LONG}$; the back surface and the front surface of the substrate may be separated by a thickness d; and d may be greater than $(m/2)*(V_{LONG}/f)$ and less than $(5/4) \cdot (m/2) \cdot (V_{LONG}/f)$, where m is a positive integer.

In some embodiments, the substrate may include a mode conversion array on the back surface of the substrate outside of the touch region. The mode conversion array may be configured to coherently scatter the surface acoustic wave as the surface acoustic wave propagates in a first direction along a length of the mode conversion array into a near-longitudinal-resonance Lamb wave that propagates in a second direction through the touch region. In some embodiments, the mode conversion array may include multiple reflector elements disposed along the first direction. The multiple reflector elements may be formed from at least one of the group of glass frit, ceramic, loaded polymer, or etched grooves. In some embodiments, the near-longitudinal-resonance Lamb wave may propagate through the touch region with a phase velocity $V_P$; the surface acoustic wave may propagate on the back surface with velocity $V_{SAW}$; the first direction and the second direction may define a scattering angle $\Phi$; the mode conversion array may include multiple reflector elements disposed along the first direction, each reflector element of the multiple reflector elements disposed at a reflector angle $\theta$ relative to the first direction; and $\cos(\theta)/V_{SAW}=\cos(\theta-\Phi)/V_P$. In some embodiments, a distance S along the first direction between two consecutive reflector elements of the multiple reflector elements is given by $S=n*(V_{SAW}/f)/(1-(V_{SAW}/V_P)*\cos(\Phi))$, where n is a positive integer.

Some embodiments of the method may provide for minimizing dispersion for a touch apparatus. For example, generating the electrical excitation signal may include generating the electrical excitation signal with a frequency spread $\Delta f$ around an operating frequency f. The near-longitudinal-resonance Lamb wave may propagate through the touch region of the substrate at the operating frequency f with the frequency spread $\Delta f$.

In some embodiments, the method may further include anti-dispersing the electrical excitation signal with a frequency dependent phase error before sending the electrical excitation signal to the transmitting transducer. The frequency dependent phase error may be configured to compensate for dispersion of the near-longitudinal-resonance Lamb wave caused by propagation of the near-longitudinal-resonance Lamb wave through the substrate with the frequency spread $\Delta f$.

In some embodiments, the near-longitudinal-resonance Lamb wave propagates through the substrate with a group velocity $V^G_{LAMB}$ that varies with varying operating frequencies; and generating the electrical excitation signal may include generating the electrical excitation with the operating frequency f near an inflection point of the group velocity $V^G_{LAMB}$ as a function of the varying operating frequencies. Additionally and/or alternatively, generating the electrical excitation signal may include generating the electrical excitation with the operating frequency f such that the group velocity $V^G_{LAMB}$ has a low operating frequency dependence within the frequency spread $\Delta f$. In some embodiments, the near-longitudinal-resonance Lamb wave may propagate a distance L through the touch region; the near-longitudinal-resonance Lamb wave may propagate with a group velocity $V^G_{LAMB}$; the surface acoustic wave may propagate on the back surface with velocity $V_{SAW}$; the touch on the front surface of the substrate in the touch region may define a distance $\Delta X$; and $(V_{SAW}/V^G_{LAMB})*|d(\ln(V^G_{LAMB})/d(\ln(f))|$ may be less than or equal to $2*(\Delta X/L)/(f/\Delta f)$. In some embodiments, the near-longitudinal-resonance Lamb wave may propagate a distance L through the touch region; the near-longitudinal-resonance Lamb wave may propagate with a group velocity $V^G_{LAMB}$; the surface acoustic wave may propagate on the back surface with velocity $V_{SAW}$; and $(V_{SAW}/V^G_{LAMB})*|d(\ln(V^G_{LAMB})/d(\ln(f))|$ may be less than or equal to $2*(\Delta X/L)/(f/\Delta f)$.

Some embodiments of the method may provide redundant touch determination and/or characteristics of touch determination using high sensitivity Lamb waves. For example, the electrical return signal may represent the acoustic wave including a second attenuation that occurred from the touch on a front surface of the substrate while propagating through a touch region of the substrate as a near-sheer-resonance Lamb wave. The method may further include redundantly determining the location of the touch based on the electrical return signal that represents the acoustic wave including the attenuation of the near-longitudinal-resonance Lamb wave and the second attenuation of the near-sheer-resonance Lamb waves in the touch region caused by the touch. The method may further include comparing a magnitude of the attenuation represented by the electrical return signal with a magnitude of the second attenuation represented by the electrical return signal.

Some embodiments may include one or more machines, such as an apparatus and/or system, configured to implement the methods and/or other functionality discussed herein. For example, the machine may include circuitry and/or one or more processors and/or other machine components configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
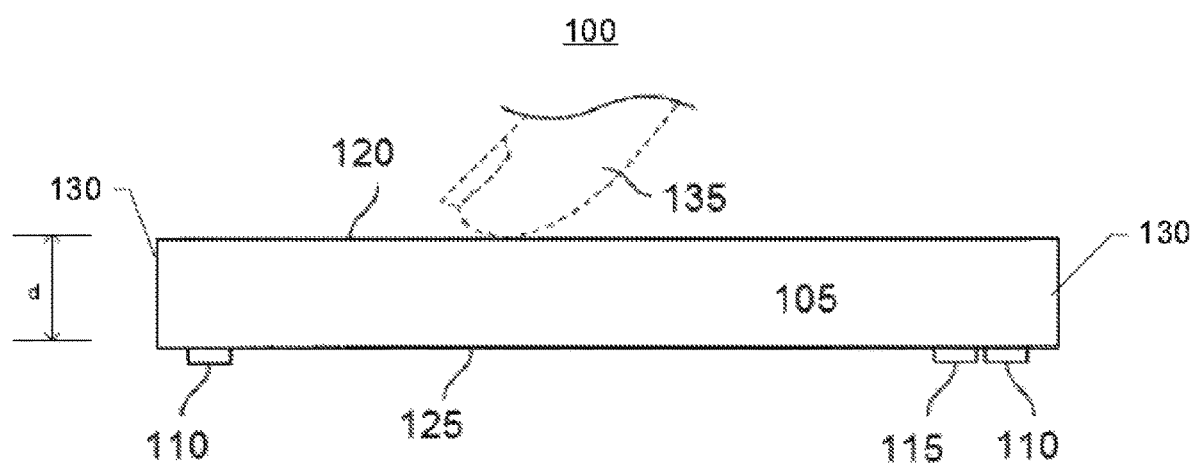
Figure 2A:
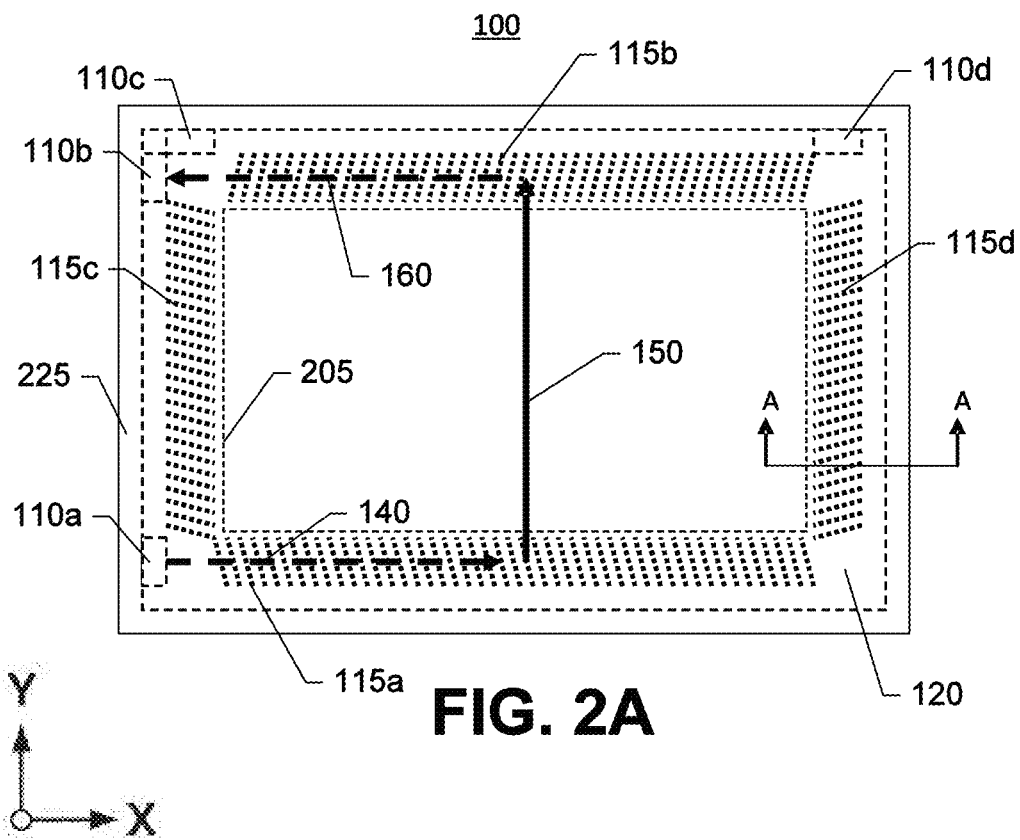
Figure 2B:
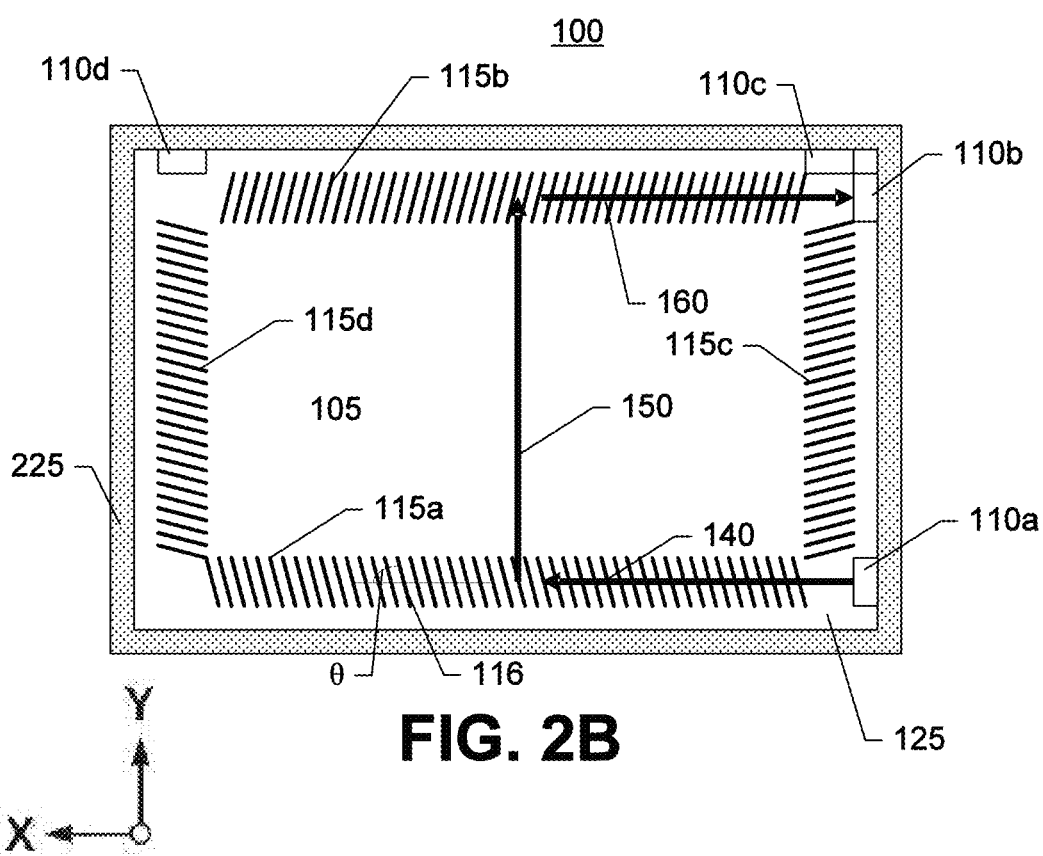
Figure 2C:
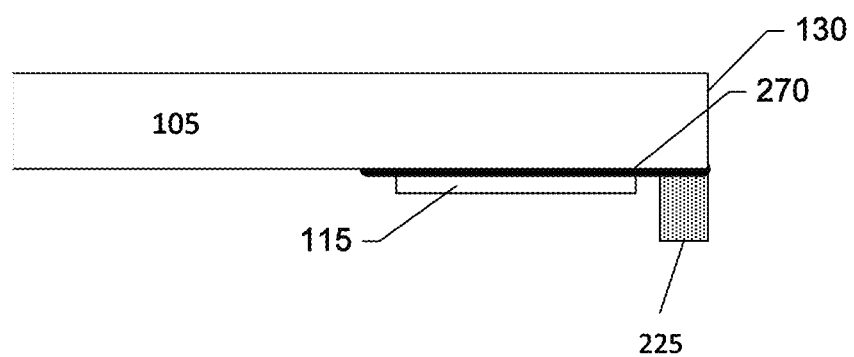
Figure 3:
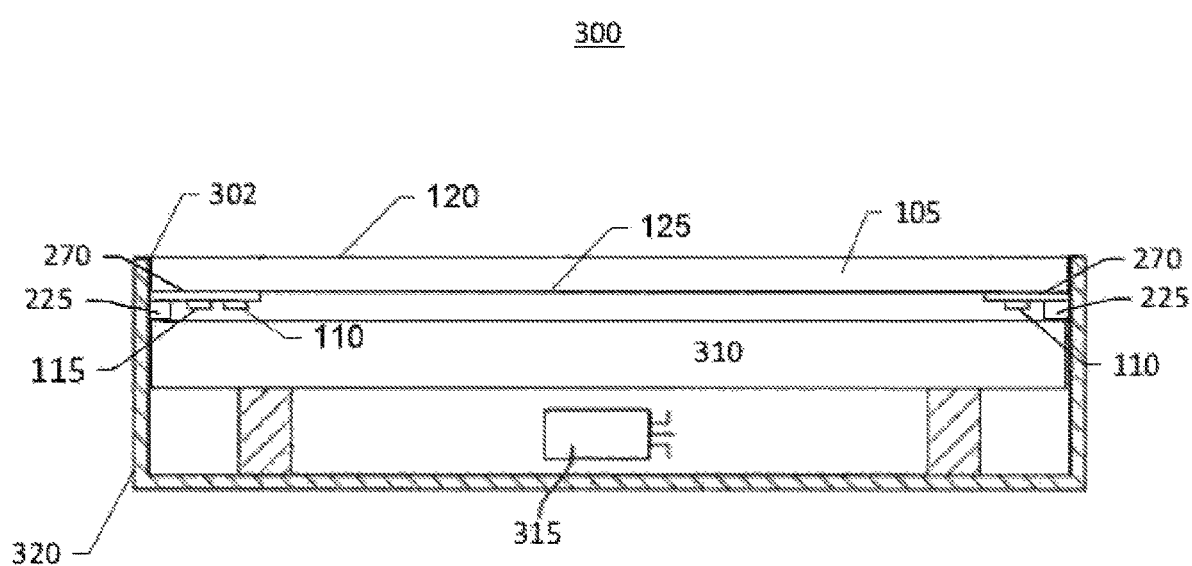
Figure 4:
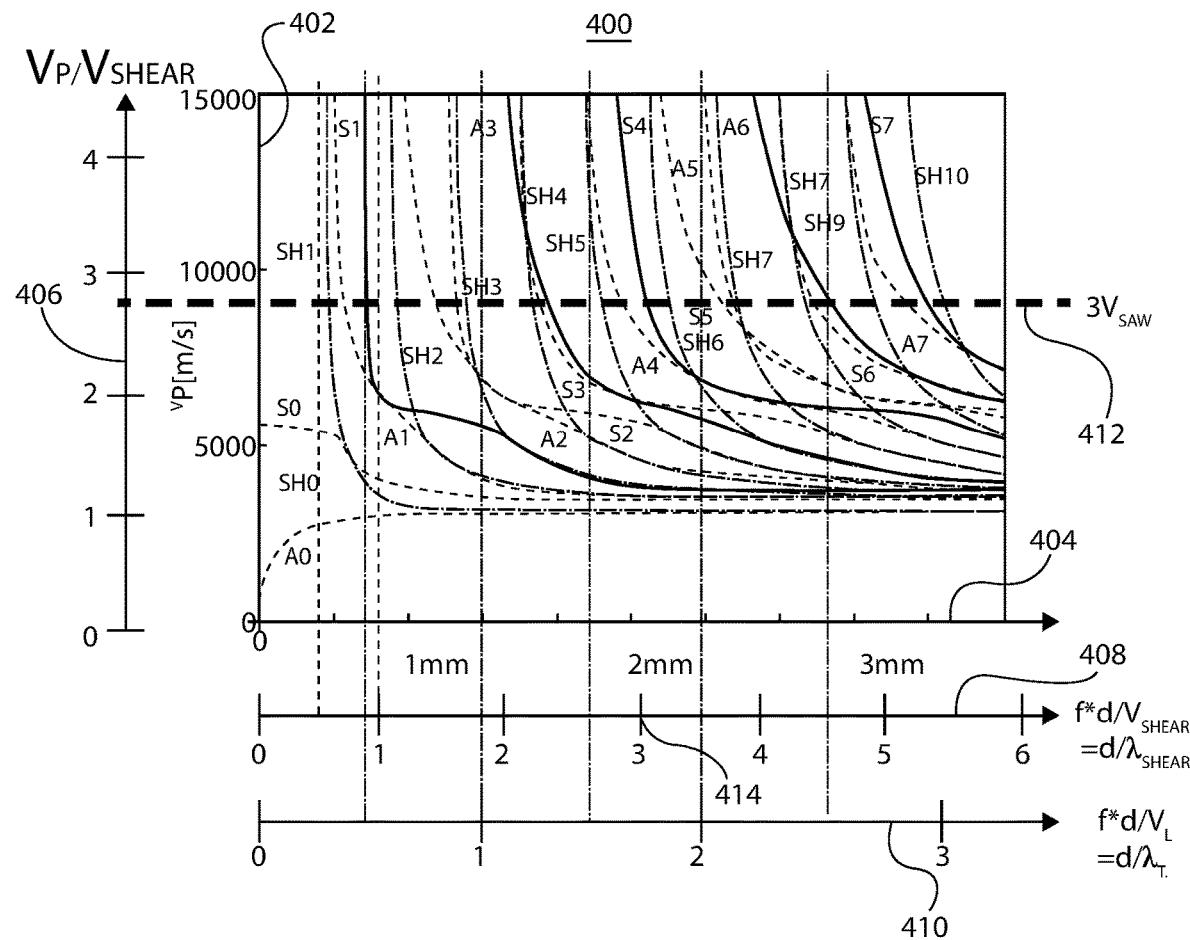
Figure 6A:
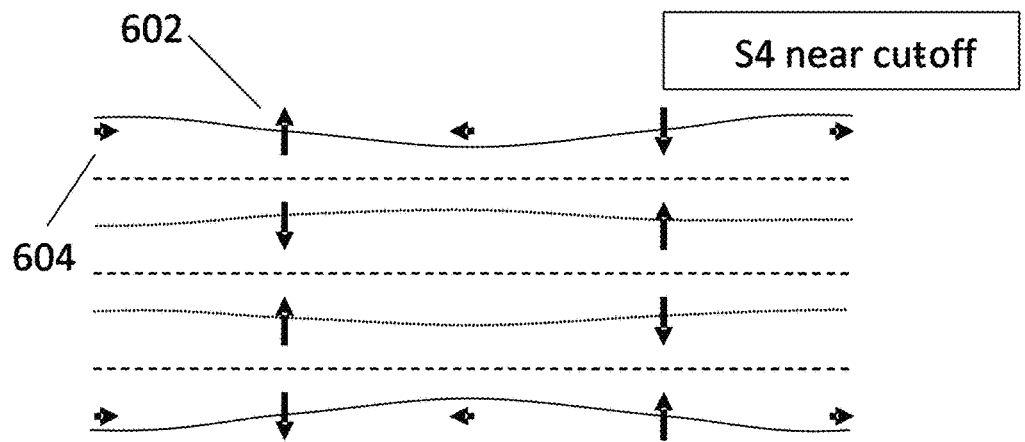
Figure 6B:
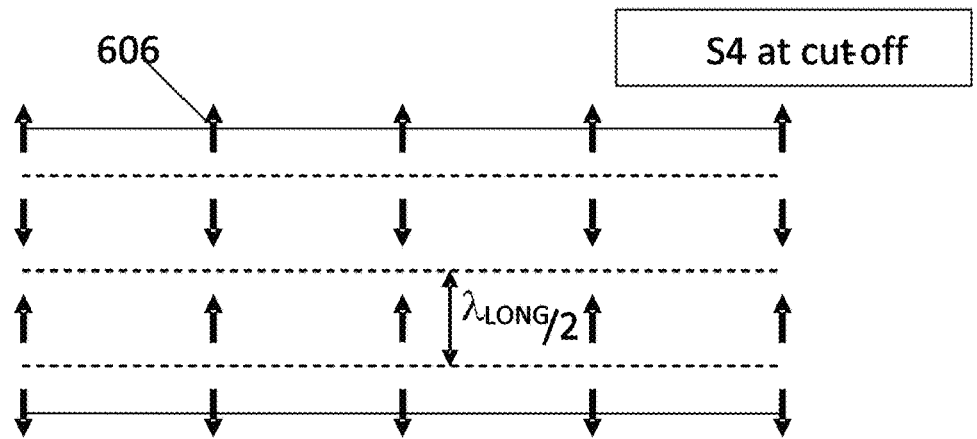
Figure 6C:
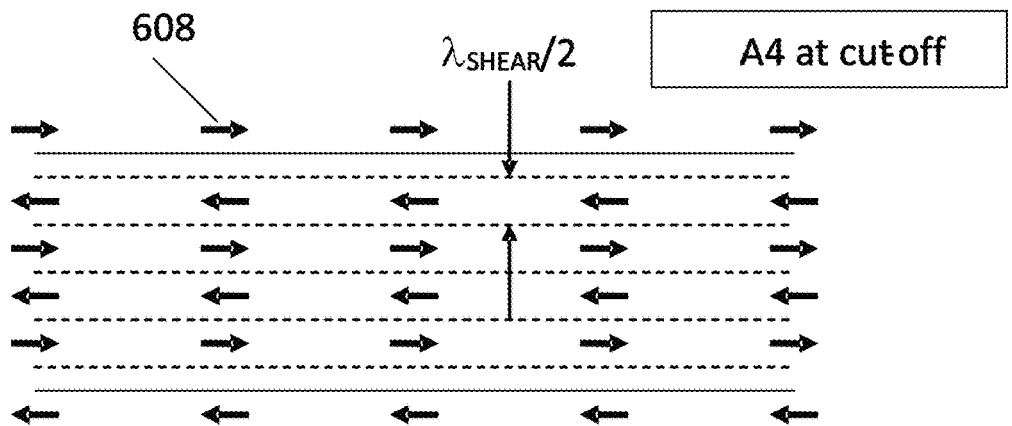
Figure 7:
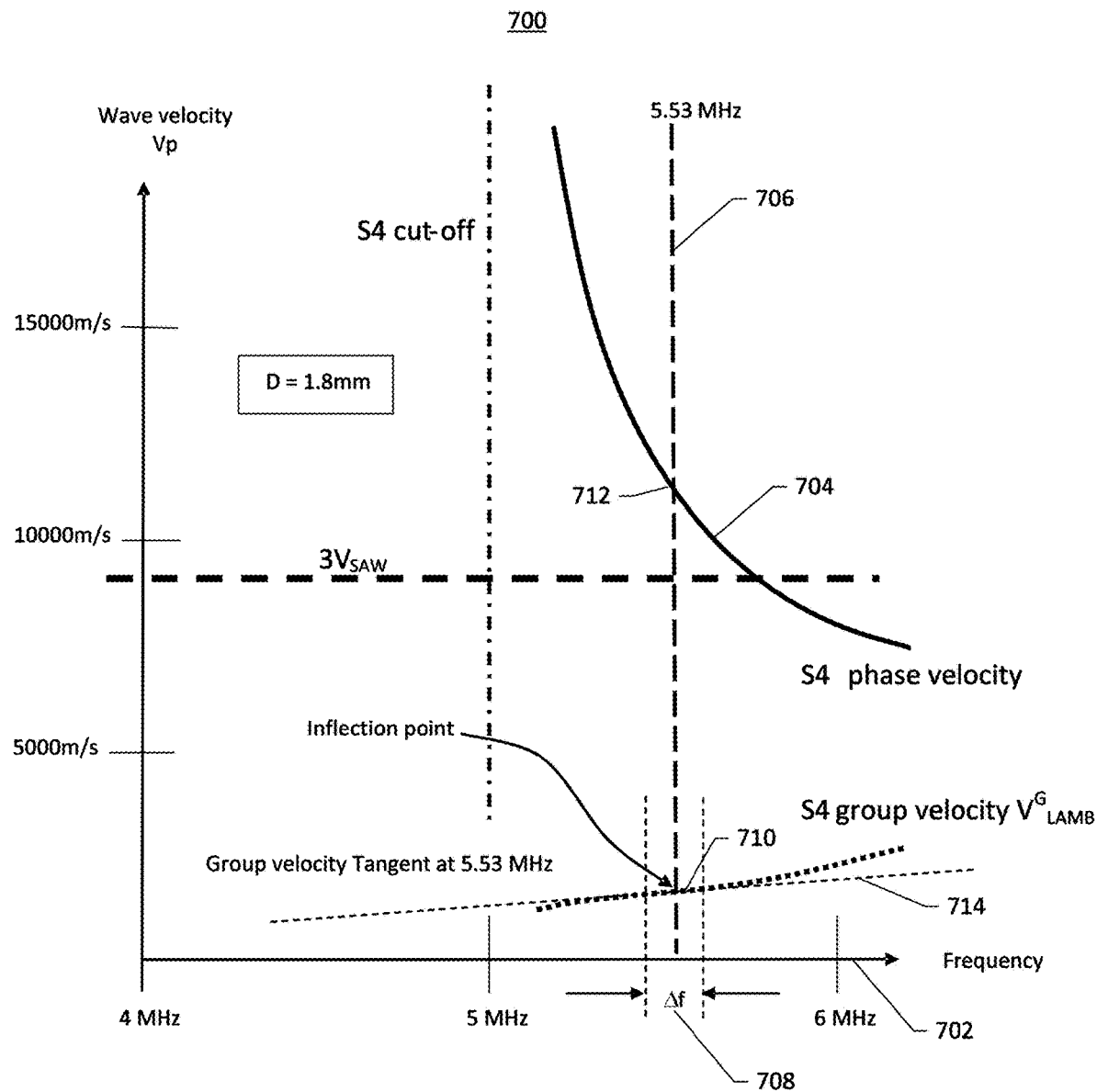
Figure 8:
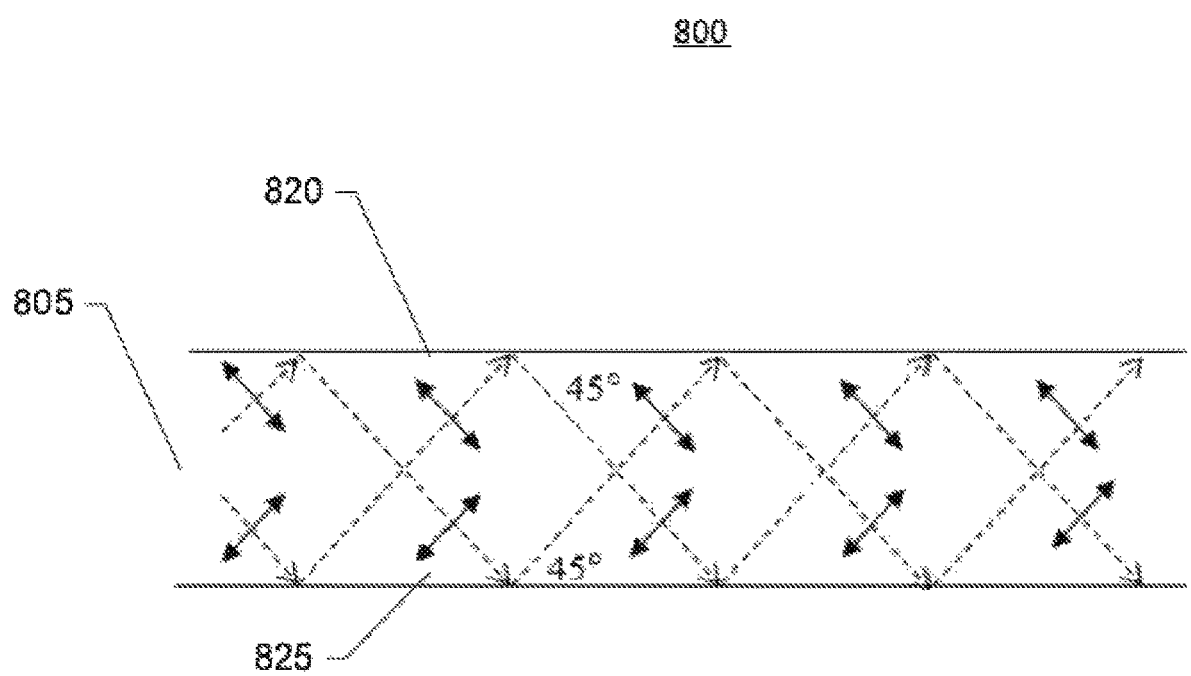
Figure 9A:
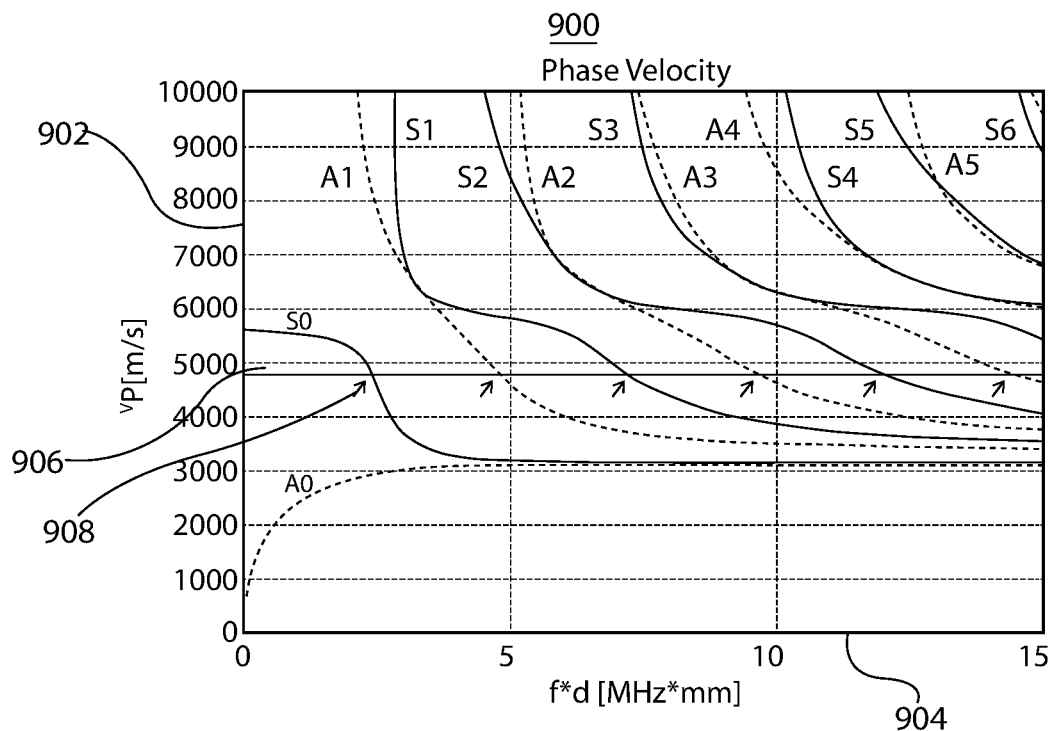
Figure 9B:
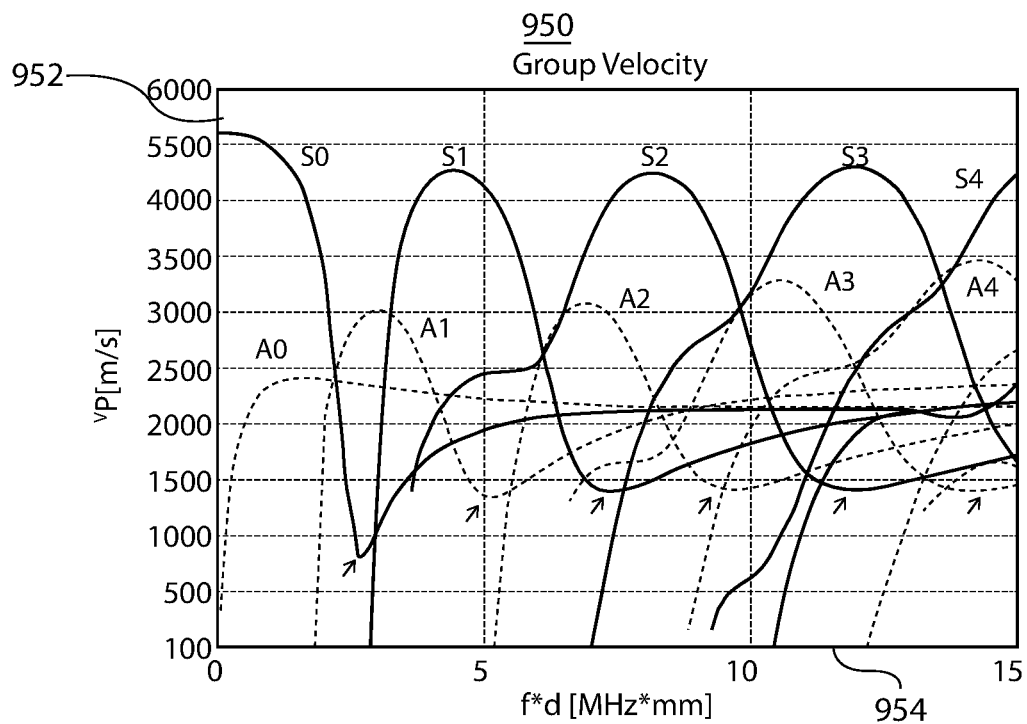
Figures 10, 11:
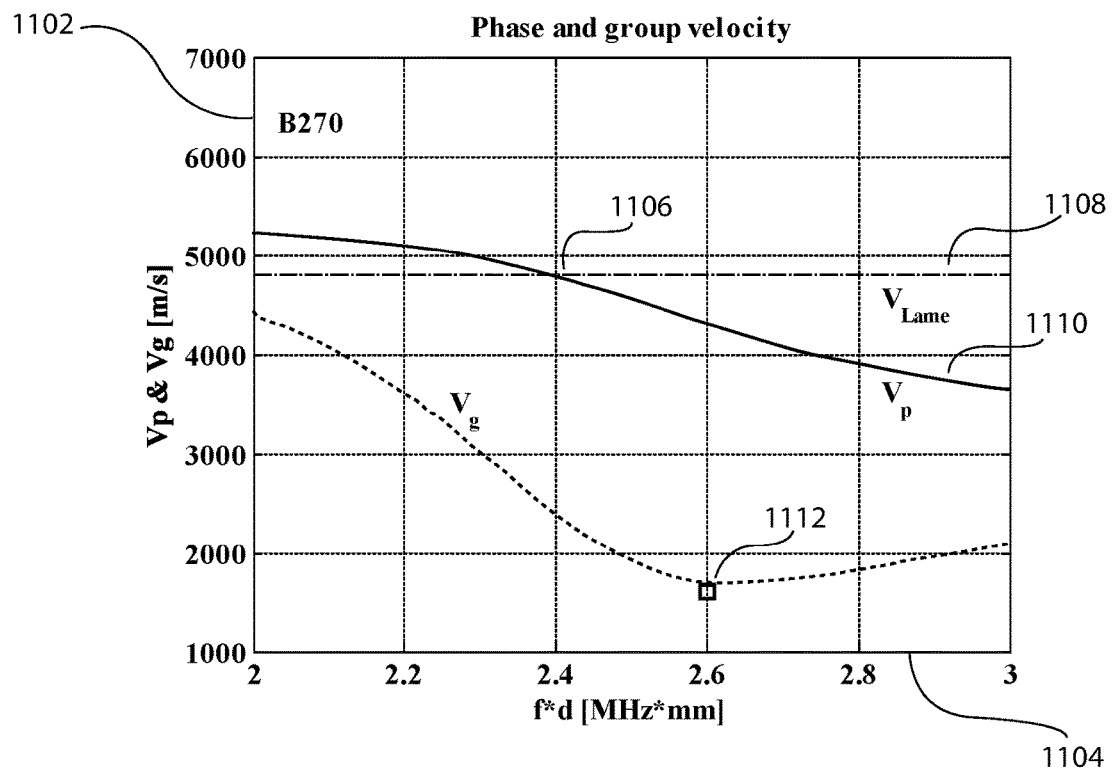
Figure 12A:
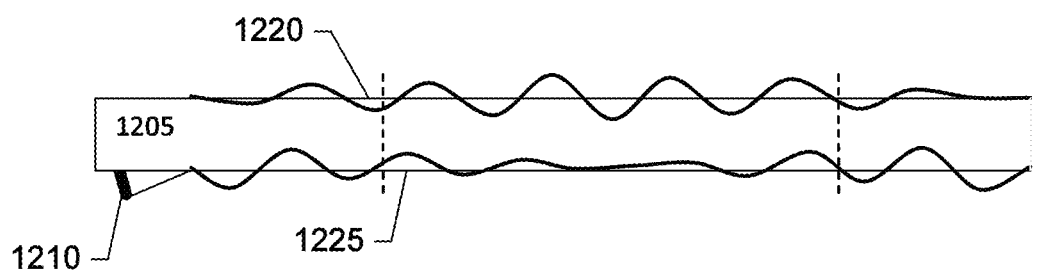
Figure 12B:
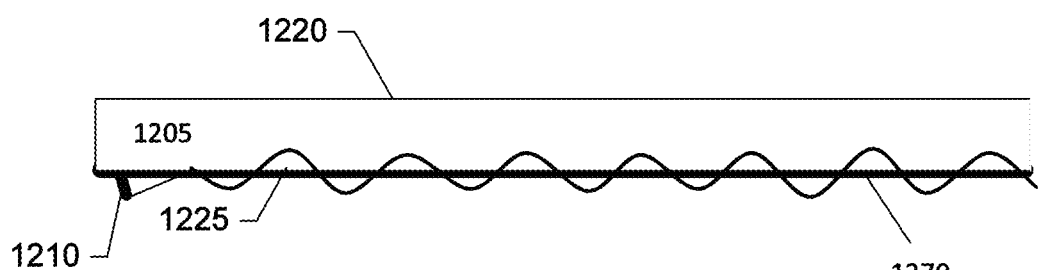
Figure 13A:
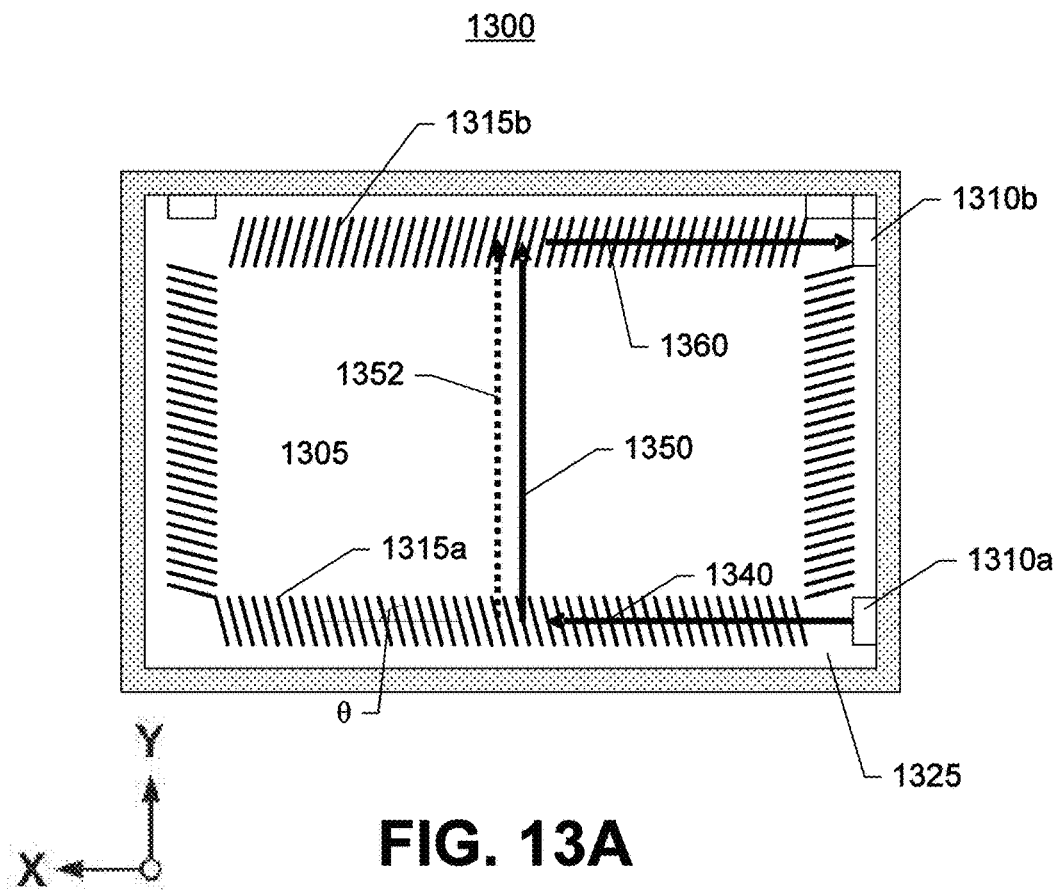
Figure 13B:
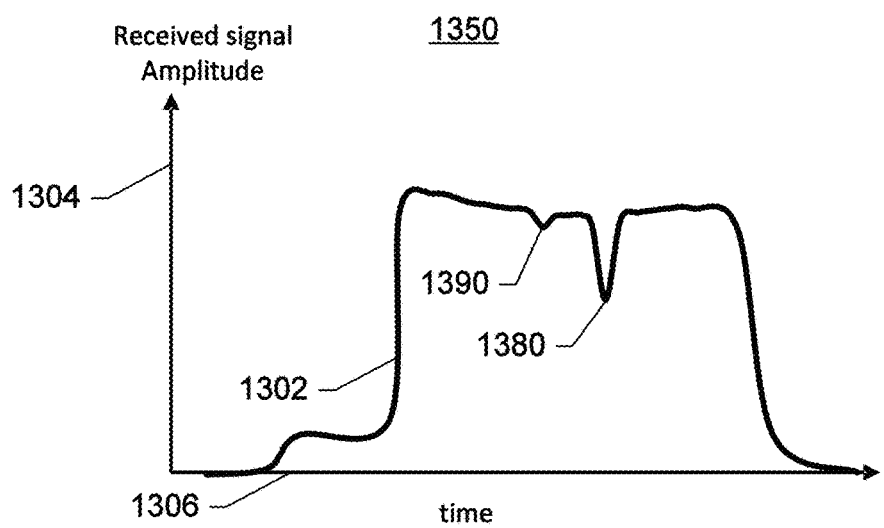
Figure 14:
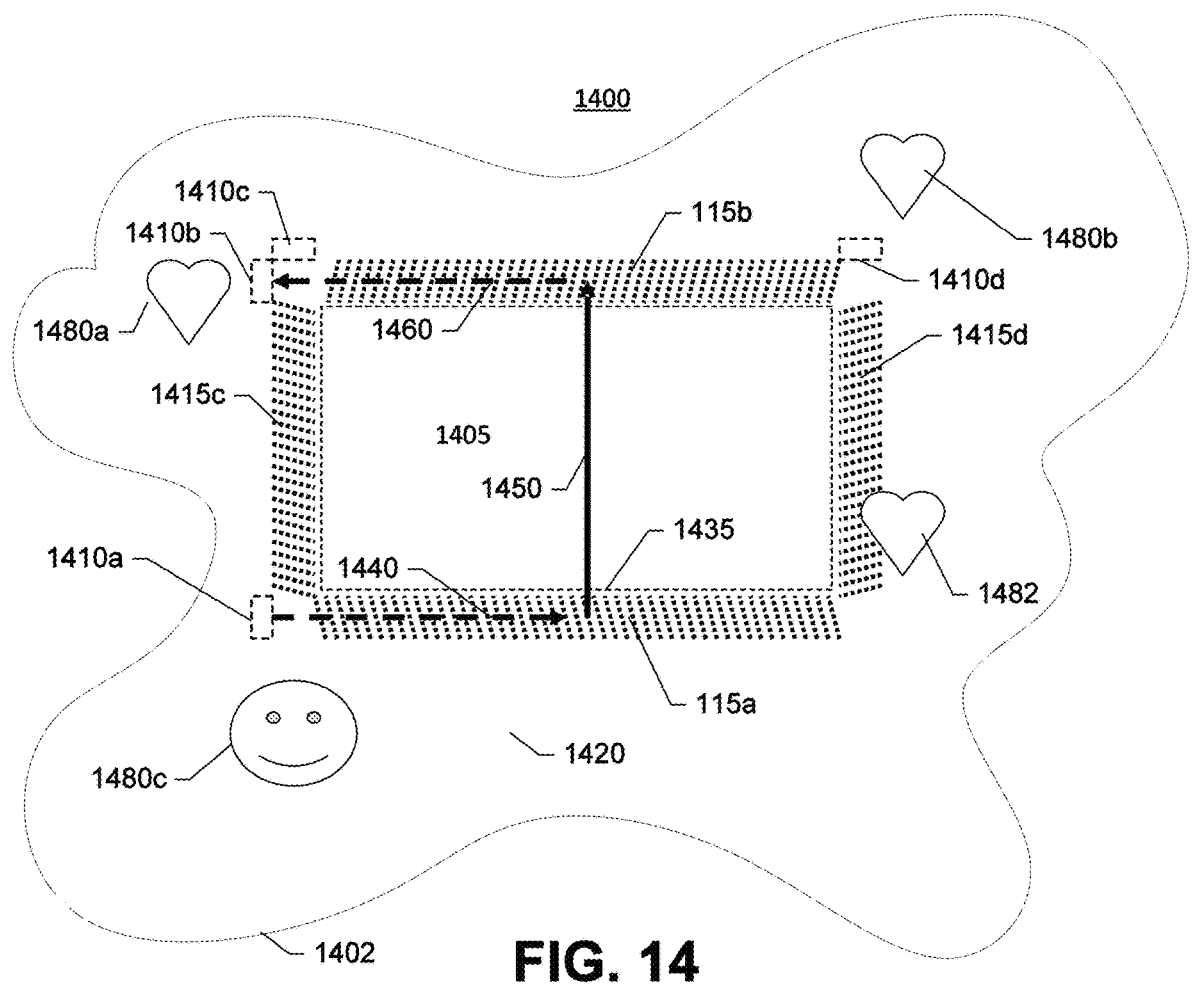
Figure 15A:
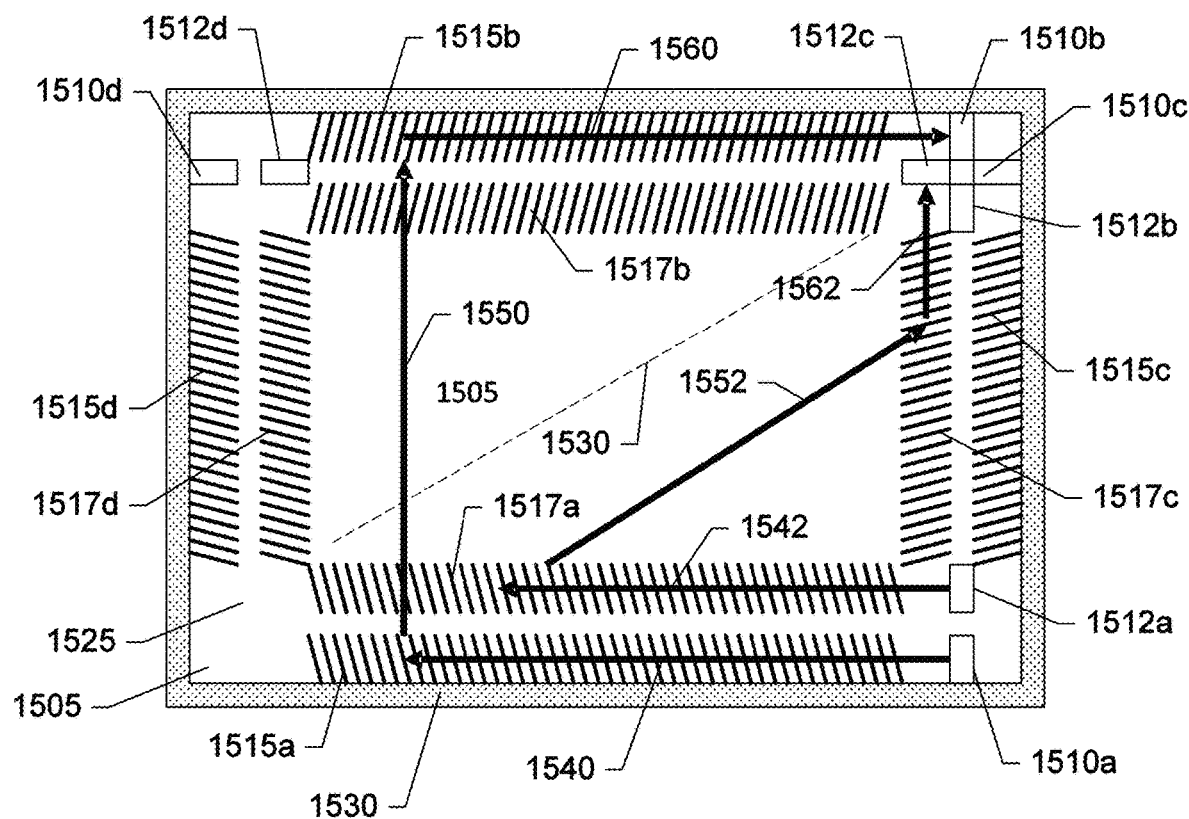
Figure 15B:
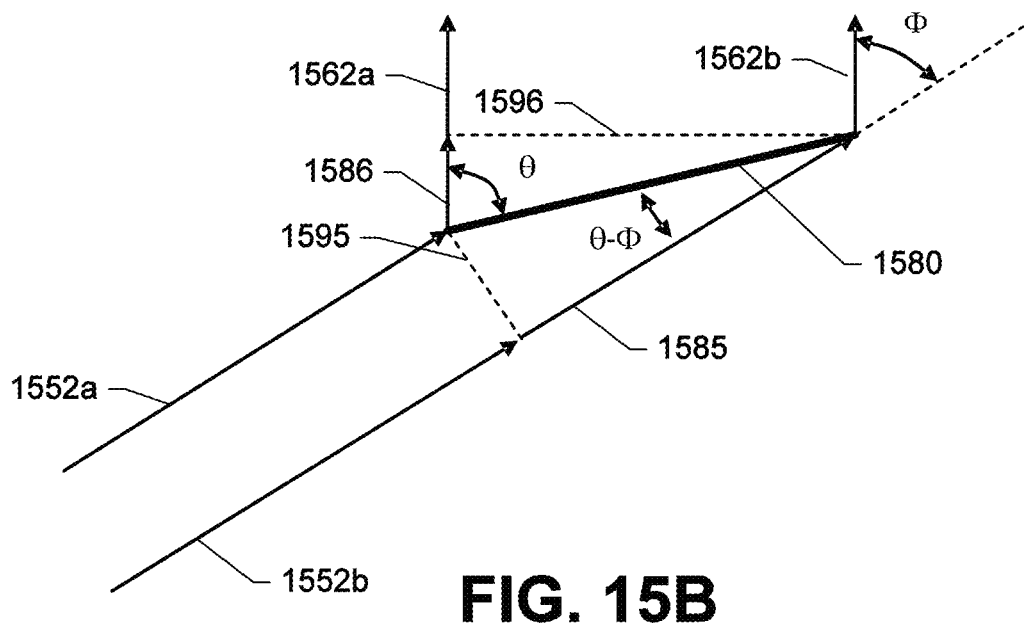
Figure 15C:
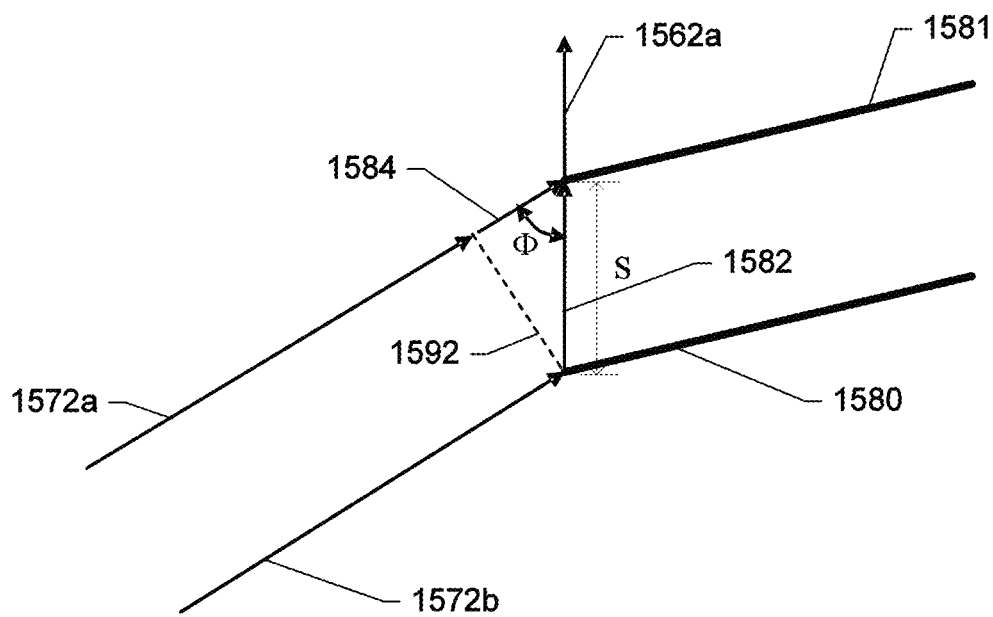
Figure 16A:
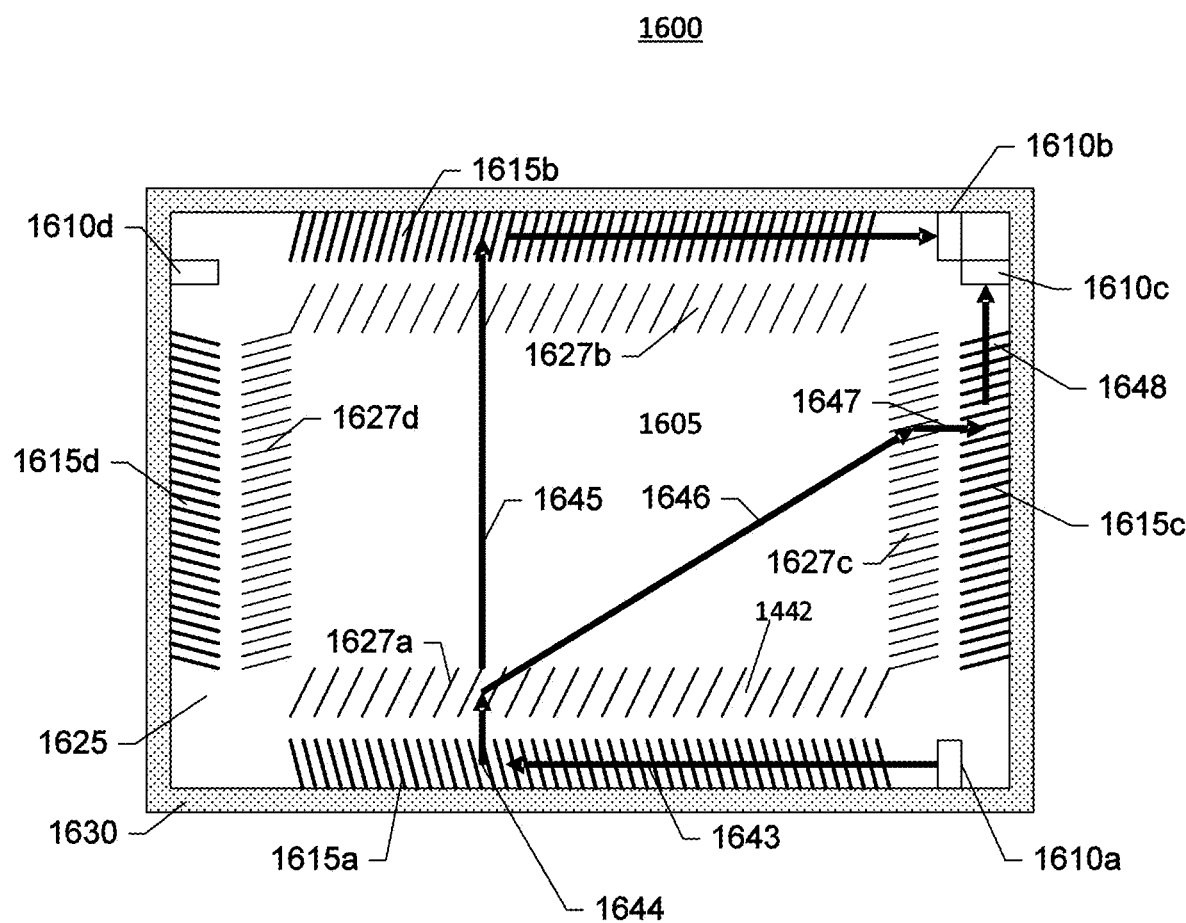
Figure 16B:
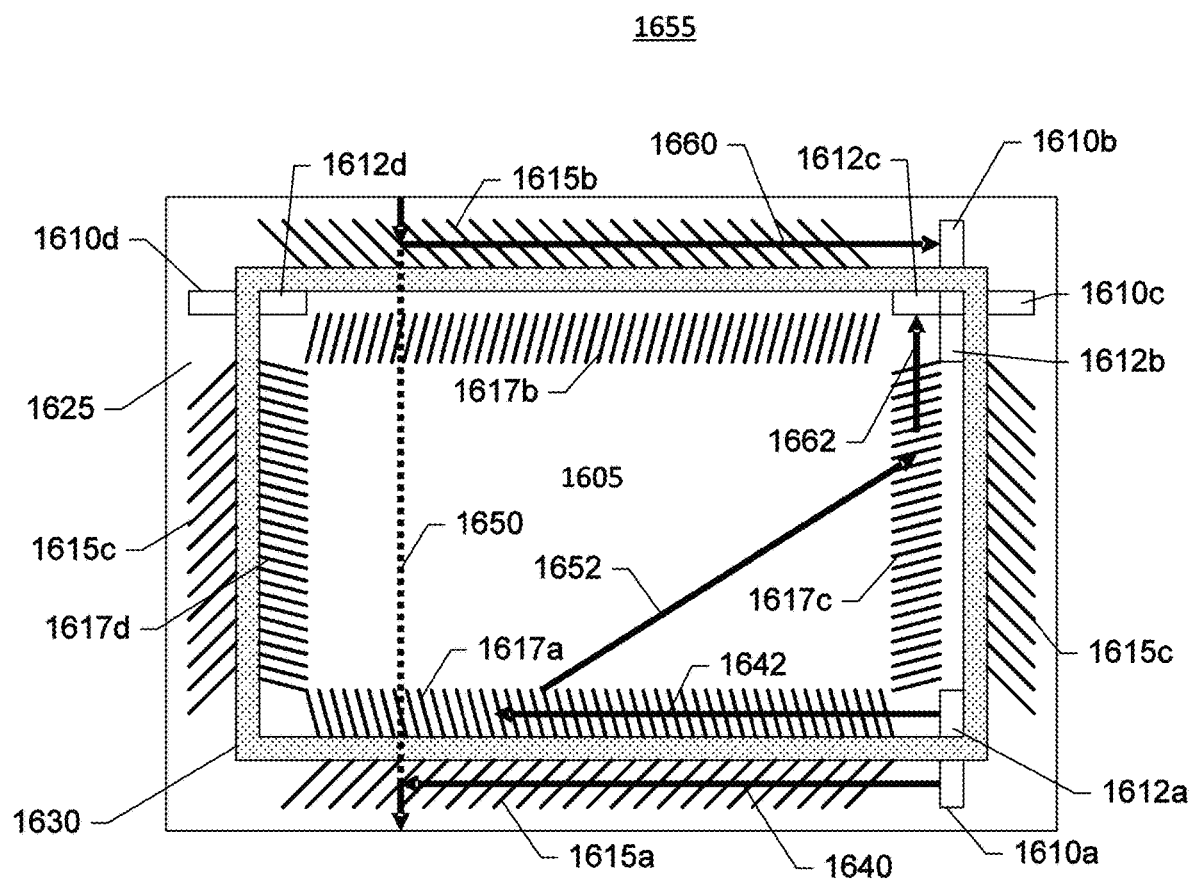
Figure 17A:
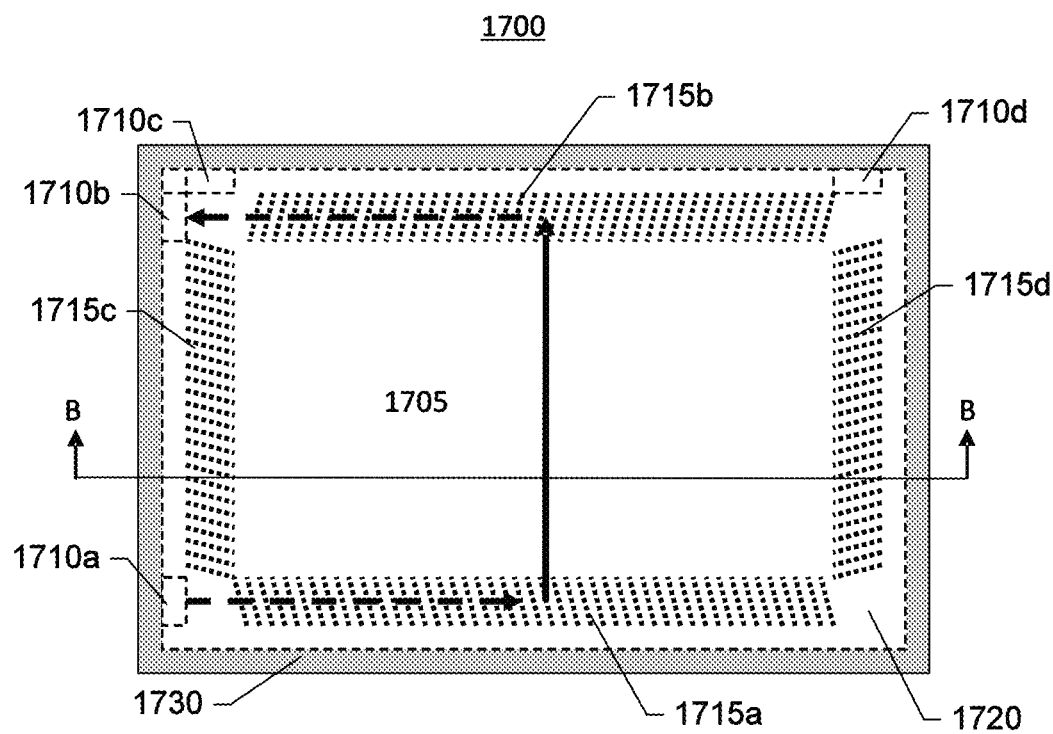
Figure 17B:
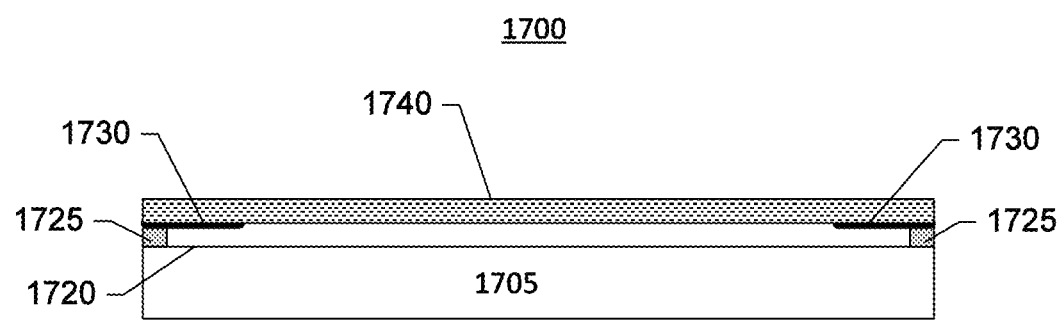
Figure 18:
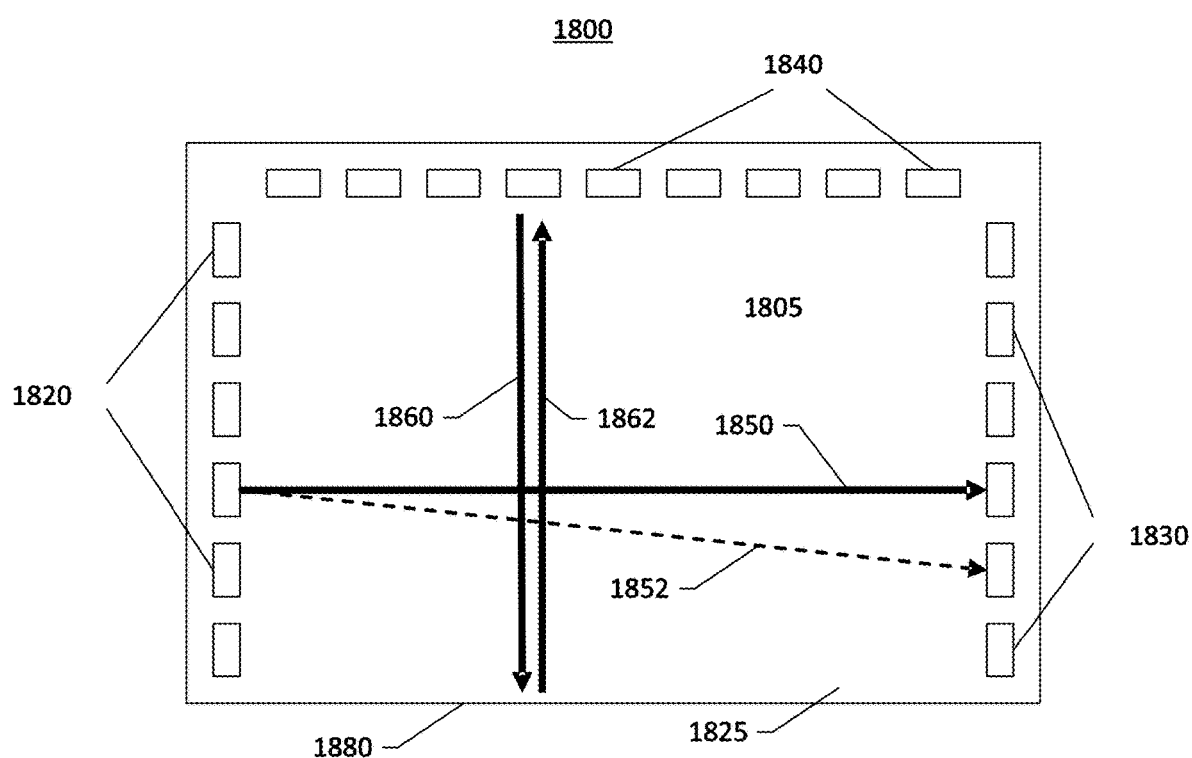
Figure 19:
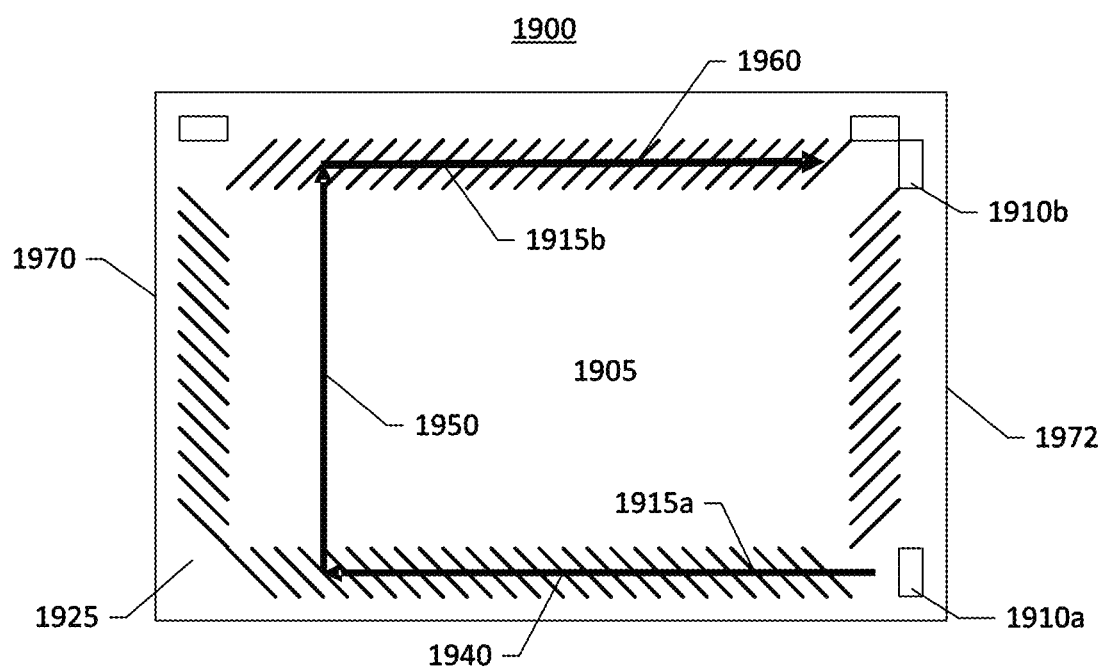
Figure 20:
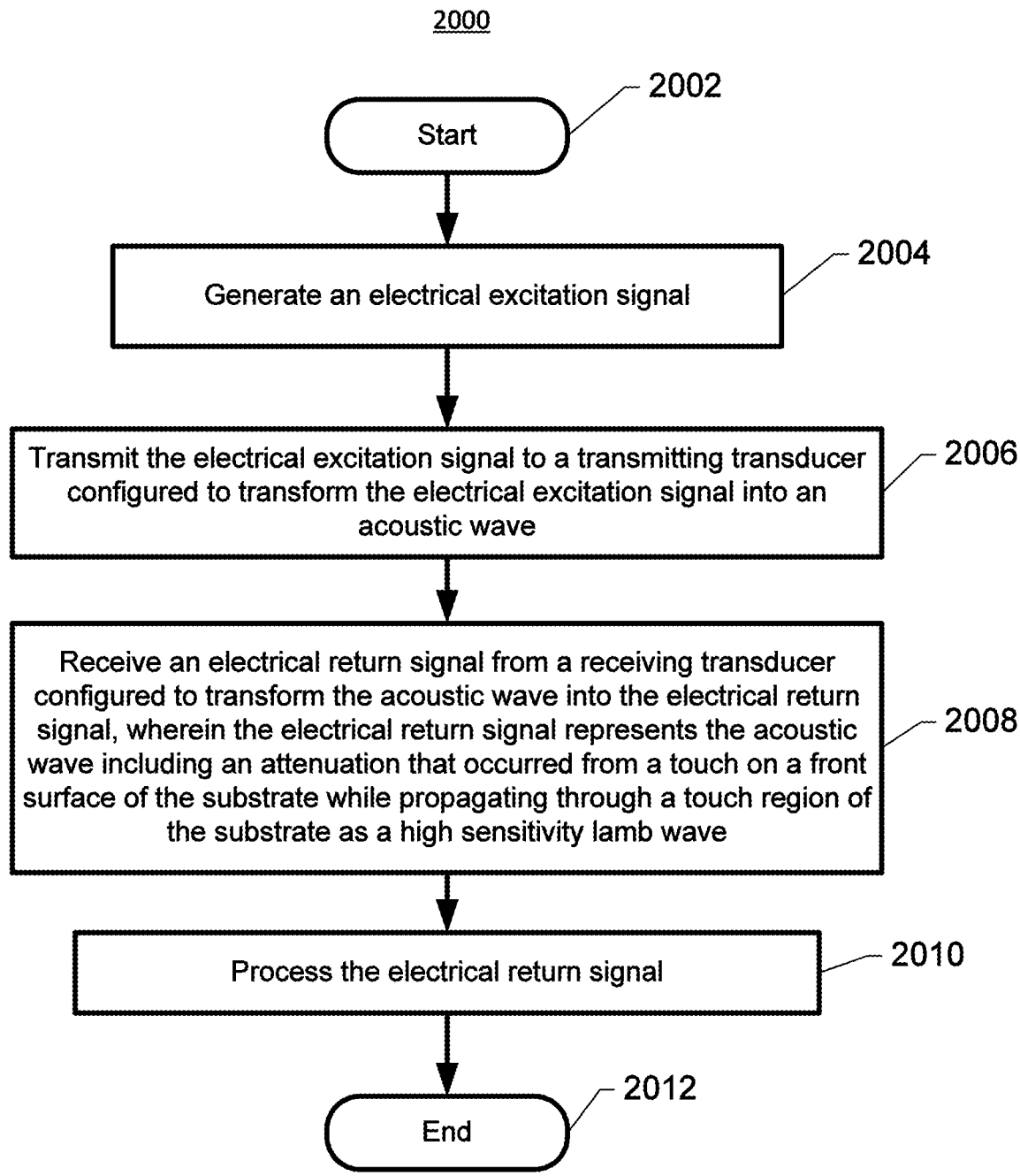
Figure 21:
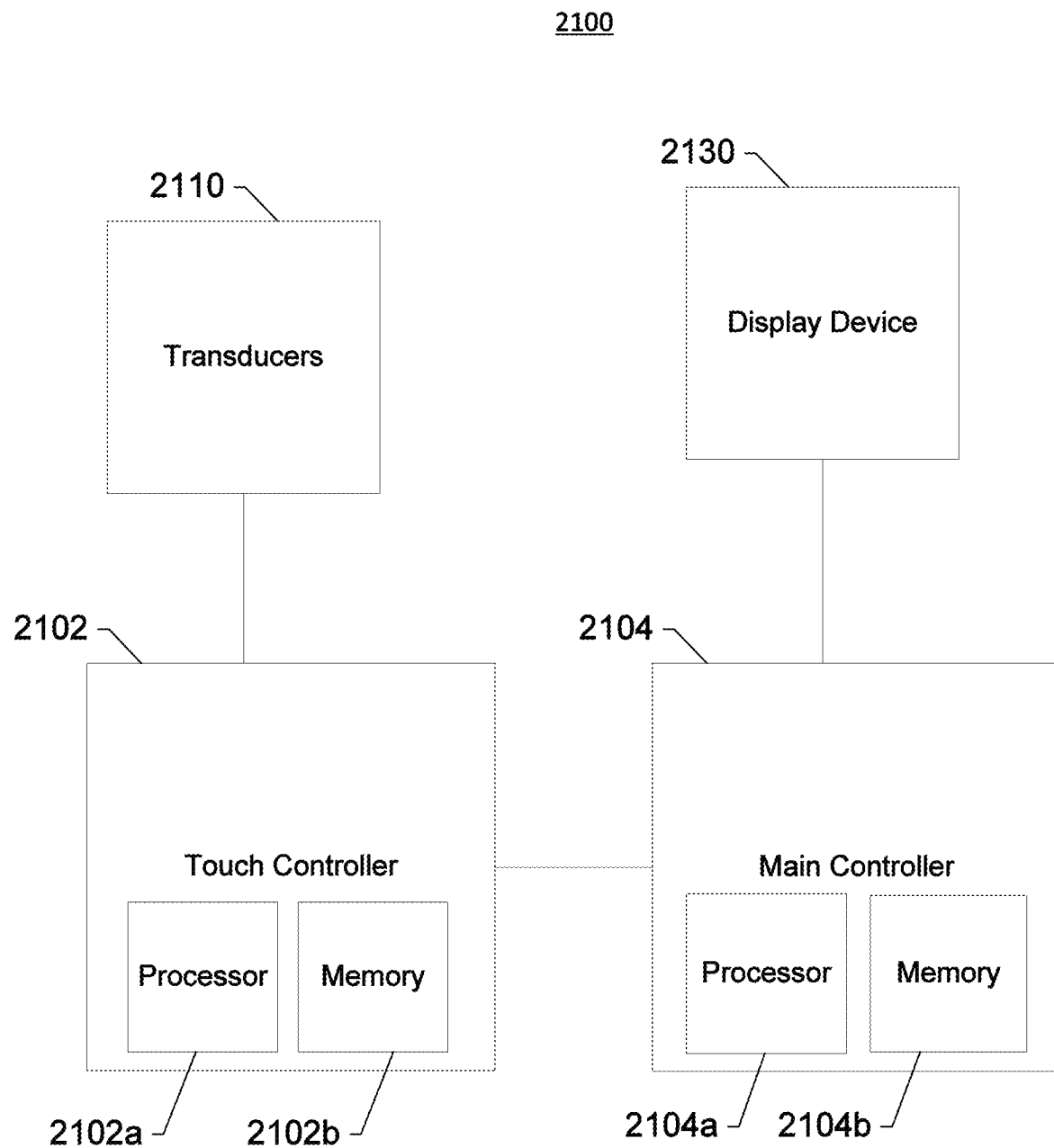

Having thus described some embodiments in general terms, reference will now be made to the accompanying drawings, which are not necessarily drawn to scale, and wherein:

FIG. 1 shows an example of a simplified cross-sectional view of an touch sensor, in accordance with some embodiments;

FIGS. 2A and 2B, respectively, show front and back views of an example substrate of a touch sensor, in accordance with some embodiments;

FIG. 2C shows the touch sensor of FIG. 2A taken along cross-section AA, in accordance with some embodiments;

FIG. 3 shows a cross-sectional view of an example touch sensor device, in accordance with some embodiments;

FIG. 4 shows an example plot of Lamb wave phase velocity ($V_P$) as a function of substrate thickness d and operating frequency f, in accordance with some embodiments;

FIGS. 5A and 5B show example tables showing example cutoff thickness values for Lamb wave modes, in accordance with some embodiments;

FIG. 5C shows an example table showing example cutoff frequency-thickness product values for Lamb wave modes, in accordance with some embodiments;

FIGS. 6A, 6B and 6C show example Lamb waves in a substrate, in accordance with some embodiments;

FIG. 7 shows an example plot of Lamb wave phase velocity ($V_P$) and group velocity $V^G_{LAMB}$ as a function frequency, in accordance with some embodiments;

FIG. 8 shows an example Lamé wave in a substrate, in accordance with some embodiments;

FIGS. 9A and 9B show example plots of Lamb wave phase velocity ($V_P$) and group velocity $V^G_{LAMB}$ as a function of frequency-thickness product, in accordance with some embodiments;

FIG. 10 shows a table of calculated touch sensitivities for Lamé waves relative to surface acoustic waves, in accordance with some embodiments;

FIG. 11 shows a plot of Lamb wave phase velocity ($V_P$) and group velocity $V^G_{LAMB}$ (also notated as "$V_g$" in FIG. 11) as a function of frequency-distance product for the S0 Lamb mode, in accordance with some embodiments;

FIG. 12A shows beat effects caused by surface acoustic waves;

FIG. 12B shows an example substrate including an acoustically beneficial layer that suppresses beat effects of surface acoustic waves, in accordance with some embodiments;

FIG. 13A shows a plan view of the back surface of a substrate configured to propagate near-shear-resonance Lamb waves, in accordance with some embodiments;

FIG. 13B shows a plot of a return signal including redundant attenuated signals, in accordance with some embodiments;

FIG. 14 shows an example touch sensor that includes a substrate having an arbitrary profile shape and graphics, in accordance with some embodiments;

FIG. 15A shows a plan view of the back surface of the substrate of an XYU touch sensor, in accordance with some embodiments;

FIGS. 15B and 15C show close up views of a reflective array (or mode conversion array), in accordance with some embodiment;

FIG. 16A shows a plan view of the back surface of a substrate of an XYU touch sensor, in accordance with some embodiments;

FIG. 16B shows a plan view of the back surface of a substrate of an XYU touch sensor, in accordance with some embodiments;

FIG. 17A shows a plan view of the front surface of a substrate of a touch sensor configured to interface with a cover sheet, in accordance with some embodiments;

FIG. 17B shows the touch sensor of FIG. 17A along cross-section BB and including a coversheet, in accordance with some embodiments;

FIG. 18 shows an example back surface of a substrate that does not include reflective arrays, in accordance with some embodiments;

FIG. 19 shows an example back surface of a substrate for a large touch sensor, in accordance with some embodiments;

FIG. 20 shows an example method for determining a location of a touch, performed in accordance with some embodiments; and FIG. 21 shows an example control system for a touch sensor, configured in accordance with some embodiments.

DETAILED DESCRIPTION

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Some embodiments may provide for touch sensors that use high sensitivity Lamb waves in the touch region, such as near-longitudinal-resonance Lamb waves or near-Lamé waves. Typically, particle motion at the surface of a substrate propagating a Lamb wave of a given power is substantially lower than for a surface acoustic wave (SAW or Rayleigh) wave of the same power, resulting in Lamb wave touch sensitivity being much less than touch sensitivity for SAW. Conventional wisdom is that desired touch sensitivity is difficult to achieve without using SAW in the desired touch area. As such, some bezel-less SAW touchscreen designs (e.g., using only surface acoustic waves) may place transducers and reflective arrays on the back side of the substrate and provide for precisely rounded substrate edges that enable transfer of SAW between back (where the SAWs are generated and collected) and front surface (e.g., where the SAWs traverse in between generation and collection to be attenuated by a touch event), as described in further detail in U.S. Patent Application No. 2011/0234545, titled "Bezel-less Acoustic Touch Apparatus." Such bezel-less SAW touchscreen products have been met with commercial success, but are costly to manufacture because the precisely rounded substrate edges must be carefully controlled. Further, because a surface acoustic waves transfer from the back surface to the front surface of a substrate and from the front surface to the back surface of a substrate by following the precisely rounded substrate edges, other elements, such as graphics and mounting tapes, can inhibit or degrade use of this type of surface acoustic wave touch systems, and embodiments of the present invention may be used instead.

Under specific conditions described herein, Lamb waves may have much higher touch sensitivities than would normally be expected. Furthermore, some embodiments may provide for low-dispersion and/or reduced susceptibility to parasitic signals. Because Lamb wave are touch sensitive on both sides of the substrate (e.g., unlike surface acoustic waves), bezel-less touch sensor designs may be achieved (e.g., where transducers and reflective arrays are placed on the back surface of the substrate) without requiring that the substrate include precisely rounded substrate connecting edges, or connecting portions.

Other example, but non-exhaustive, advantages that may be realized by various embodiments using high sensitivity Lamb waves, may include anti-dispersion for more accurate touch sensing, larger touch sensor sizes, multi-touch detection (e.g., XYU sensors), smaller touch sensor thickness, flexibility in touch sensor profile shapes and/or industrial design, redundant touch sensing, nature of touch differentiation.

FIG. 1 shows a simplified cross-sectional view of an example touch sensor 100, configured in accordance with some embodiments, but where the thickness d (e.g., the height) is exaggerated relative to the length shown. Touch sensor 100 may include substrate 105, acoustic wave transducers 110 (or transducers 110) and reflective arrays 115. Substrate 105 of touch sensor 100 is shown as having front surface 120, back surface 125, and connecting surface 130 that joins front surface 120 and back surface 125 along the perimeter of substrate 105. The distance between font surface 120 and back surface 125, i.e., connecting surface 130, may define the thickness d of substrate 105. Transducers 110 and reflective arrays 115 may be disposed on back surface 125.

FIGS. 2A and 2B, respectively, show front and back views of touch sensor 100, configured in accordance with some embodiments. More specifically, FIG. 2A shows a plan view of front surface 120 of touch sensor 100, and FIG. 2B shows a plan view of back surface 125 of touch sensor 100. Transducers 110 (including transducers 110a, 110b, 110c and 110d) and reflective arrays 115 (including transducers 115A, 115B, 115C and 115d) that are disposed on the back surface 125 are shown in FIG. 2A as dotted lines to provide a frame of reference in relation to FIG. 2B, where transducers 110 are shown in solid lines. To provide a further frame of reference, X-Y coordinate axes are shown in FIGS. 2A and 2B.

Front surface 120 may include touch-sensitive region 205 (or touch region 205) on which an object 135 (as shown in FIG. 1) may create a contact event or touch event. Touch region 205 may be defined as an inner portion of front surface 120 that is considered the active touch region. Touch region 205 is shown within dotted lines in FIG. 2A. Object 135 is shown in FIG. 1 as a finger, but touch events that may be sensed by the touch sensor system may include, e.g., a finger, stylus, or other object contacting front surface 120 directly or indirectly through a cover sheet, an anti-reflective coating, and/or any other suitable material. In some embodiments, touch region 205 may correspond to a transparent area of touch sensor 100 through which the user can view a display (e.g., disposed behind back surface 125) and for which X and Y coordinates of locations of touches may be determined. In this regard, touch sensor 100 may be coupled to a control system or controller having a number of functions, including the coordinating of touch functionality with the presentation of displays, some examples of which are discussed below.

Substrate 105 may serve as a propagation medium that supports propagation of surface acoustic waves (SAW) and Lamb waves. Surface acoustic waves and Lamb waves, as discussed in greater detail below, are different types of acoustic waves. In some embodiments, substrate 105 may be transparent and isotropic. Substrate 105 may comprise any suitable glass (e.g., soda lime glass; boron-containing glass, e.g., borosilicate glass; barium-, strontium-, zirconium- or lead-containing glass; crown glass), and/or other suitable material(s). For example, a material capable of propagating surface acoustic waves and Lamb waves with a relatively low loss, thereby resulting in better signals, may be preferred according to some embodiments. In some embodiments of touch sensors that are not intended to be used as touch screens (for example, those intended to be used as a peripheral touchpad or integrated trackpad), one or more opaque substrate materials, having acceptable acoustic losses (such as aluminum and/or steel), may be used in touch sensitive region 205.

One or more acoustic wave transducers 110 may be positioned on, or otherwise coupled to, back surface 125 of substrate 105. Various types of transducers may be used in accordance with some embodiments. As referred to herein, a "transducer" includes a physical element or set of elements that transforms energy from one form to another, such as between electrical energy and a desired form of acoustic energy. For example, transducers 110 may include one or more piezoelectric elements that function as acoustically emissive and/or sensitive structures. Any device that may be configured to transform electrical energy to acoustic energy or acoustic energy to electrical energy may be a transducer or transducing means, in accordance with some embodiments.

Transducers 110 may be disposed on back surface 125 for transmitting and/or receiving acoustic waves. A "transmitting transducer," as used herein, refers to at least one of transducers 110 that is configured to transform electrical energy into a desired form of acoustic energy. For example, a transmitting transducer may include one or more electrodes that are coupled to a controller. The controller may be configured to generate one or more electrical signals, such as pseudo sinusoidal wave tone bursts at one or more desired frequencies. These electrical signals, which are generated by the controller and provided to the transmitting transducer, are sometimes referred to herein as "excitation signals." The excitations signals may be applied to the electrodes of the transmitting transducer to cause the piezoelectric element therein to vibrate, thereby transforming electrical signals into acoustic waves having one or more controllable and configurable characteristics (e.g., operating frequency, phase velocity, etc).

A "receiving transducer," as used herein, refers to at least one of transducers 110 that is configured to transform acoustic energy into a desired form of electrical energy. A receiving transducer may include, for example, electrodes coupled to the controller, a piezoelectric element, a wedge shaped coupling block, and/or any other suitable component(s). As such, surface acoustic waves traveling through the substrate may cause vibrations in the piezoelectric element (e.g., via the coupling block), which in turn causes an oscillation voltage to appear on the electrodes. In some embodiments, a single physical transducer may serve as both receiving transducer and a transmitting transducer.

At the receiving transducer, the oscillation voltage on the electrodes may include amplitudes that correspond with amplitudes of return surface acoustic waves received at the receiving transducer. Thus, when perturbations, such as those caused by a touch event, attenuate acoustic waves propagating on the substrate between a transmitting transducer and receiving transducer, the attenuation also appears at the electrodes of the receiving transducer in the form of a voltage perturbation, such as attenuation 1380 of return signal 1302 shown in FIG. 13B, included in the electrical return signal generated by the receiving transducer and provided to a controller. Controller electronics may be separated from transducers by a length of cable; alternately portions of controller electronics may be located at the transducers, such as a signal power boosting pre-amplifier circuit added to a receiving transducer assembly. In various embodiments, transducers 110 may be configured to transmit and/or receive different types of acoustic waves with substrate 105, such as surface acoustic waves and/or Lamb waves.

One or more reflective arrays 115 may be placed on back surface 125 of substrate 105. Each reflective array 115 may include a plurality of reflector elements. In some embodiments, one or more of the reflector elements may be configured to purposefully function as inefficient reflectors that (1) allow a substantial portion of an acoustic wave to pass un-scattered as the acoustic wave propagates along the reflective array, and (2) cause the coherent scattering of a relatively small portion of the acoustic wave. In some embodiments, one or more of the reflective arrays 115 may be mode conversion arrays. A mode conversion array, as used herein, refers to a reflective array that is also configured to transform (e.g., via coherent scattering) acoustic energy from a first acoustic mode to a second acoustic mode, such as from surface acoustic wave mode into a Lamb wave mode and/or vice versa.

Reflective arrays 115 may be formed in any suitable manner. For example, reflective arrays 115 may be formed from glass frit, ceramic, loaded polymer, and/or etched grooves. Reflective arrays 115 may be manufactured by printing, etching, stamping a metal substrate, and/or shaping a mold for a polymer substrate. In one example, reflective arrays 115 may be formed of a glass frit and/or UV curable ink that is silk-screened onto a glass sheet and/or other substrate material, such as formed by a float process, and cured in an oven to form a chevron pattern of raised glass interruptions, which may thereby function as the reflector elements discussed above. In some embodiments, the reflector elements may be configured to have heights and/or depths on the order of 1% of the surface acoustic wave wavelength within substrate 105 and, therefore, only partially couple and reflect the acoustic wave's energy as discussed above.

To detect a touch event, a transducer 115 may generate a surface acoustic wave that is propagated along a first mode conversion array. Referring to FIG. 2B, this is shown by an acoustic path from transmitting transducer 110a to receiving transducer 110b is shown with a first path segment 140 along which propagates the surface acoustic wave (e.g., along reflective array 115A). As the surface acoustic wave propagates, portions of its acoustic energy is coherently scattered by reflective array 115A into Lamb waves that propagate across touch region 205, shown by second path segment 150. As the lamb waves propagate across touch region 205, they are coherently scattered by reflective array 115B back into a surface acoustic wave. The surface acoustic waves propagate along reflective array 115B to receiving transducer 110b, as shown by third path segment 160. When a touch event occurs within touch region 205, the Lamb wave propagating along path segment 150 may become attenuated. The timing of the attenuation may be determined by analyzing the acoustic signal at receiving transducer 110b, which may then be used to determine a touch coordinate (e.g., the X-coordinate) of the touch event. A touch event may be, for example, a touch, a touch-and-drag motion, or other interaction with the surface.

In some embodiments, the Lamb wave propagating along path segment 150 may be sensitive to touch on both front surface 120 and back surface 125 of substrate 105. In most applications, the touch sensitivity of only one surface (typically referred to as the front surface) is used while the other surface (typically referred to as the back surface) is inaccessible to touches and is facing a display device a short distance away (e.g., as shown in FIG. 3). Nevertheless, in some embodiments of substrate 105, touch sensitivity on both surfaces may be leveraged to provide two-sided touch detection.

In various embodiments, different types of acoustic waves may be propagated along path segments 140, 150, and 160. If SAW is propagated along path segments 140 and 160 and Lamb waves are propagated along path segment 150, then touch sensor 100 may be referred to as a SAW-LAMB-SAW sensor. If LAMB waves are propagated along path segments 140, 150, and 160, then touch sensor 100 may be referred to as a LAMB-LAMB-LAMB sensor. Similarly, if surface acoustic waves are propagated along path segments 140, 150, and 160, then the touch sensor may be referred to as a SAW-SAW-SAW sensor. Similar comments may apply to acoustic paths from transmitting transducer 110c to receiving transducer 110d (e.g., using reflective arrays 110d and 110c), which may be used to determine another touch coordinate (e.g., the Y-coordinate) of the touch event.

In some embodiments, the operating frequency f (e.g., of the excitation signal) and the thickness d of substrate 105 may be selected to support a particular Lamb wave mode of desired properties, as discussed in further detail below. The reflector elements in reflective arrays 115 may be oriented to support coherent scattering in the desired direction and between desired acoustic modes (e.g., as mode conversion arrays). For example, if it is desired that a surface acoustic wave along path segment 140 be scattered at 90° and mode converted to a Lamb wave along path segment 150, then a reflector angle θ between the reflector element (e.g., as shown for reflector element 116) and the direction of the acoustic path 140 may be chosen to satisfy the relation:

$$\tan(\theta) = V_P/V_{SAW} \quad \text{Equation 1,}$$

where $V_P$ and $V_{SAW}$ are respectively the phase velocity of the Lamb wave of path segment 150 and the phase velocity of the of path segment 140.

In FIG. 2A, transducers 110, reflective arrays 115 are shown in dotted lines to indicate that they are placed on back surface 125 of substrate 105. Acoustic path segments 140 and 160 are shown as dotted lines in FIG. 2A to indicate that they might only be touch sensitive on the back surface of substrate 105, which may be the case when the acoustic mode is a surface acoustic wave. However, when acoustic path segment 150 is a Lamb wave mode, the Lamb waves may be touch sensitive on front surface 120 and back surface 125, as indicated by use of solid line in FIGS. 2A and 2B.

In some embodiments, touch sensor 100 may support a bezel-less touch/display design (such as shown in FIG. 3). To avoid cumbersome lexicon, touch sensors supporting bezel-less touch/display designs may be referred to as "bezel-less touch sensors." For example, as discussed above, transducers 110 and reflective arrays 115 may be located at back surface 125 of substrate 105 such that no bezel at front surface 120 is needed to protect transducers 110 or reflective arrays 115. Furthermore, the use of Lamb waves along path segment 150 (e.g., in touch region 205) rather than surface acoustic waves (e.g., as used along path segments 140 and 160) allows a touch event at front surface 120 to attenuate the acoustic wave even though both acoustic path segments 140 and 160 are confined to back surface 125. As such, a bezel-less touch sensor 100 may be created that does not require surface acoustic waves to travel from back surface 125 (e.g., where they are generated) to front surface 120 (e.g., where they are attenuated by touch events) and to back surface 125 (e.g., where they are received for touch location determination). A precisely rounded connecting surface to support surface acoustic wave propagation from the back surface to the front surface of the substrate, and vice versa, is also not needed. As such, the cost and manufacturing complexity of precisely rounded connecting surfaces (e.g., to properly support SAW propagation around the rounded connecting surfaces) may be avoided with the use of Lamb waves in touch region 205. Furthermore, accidental touches on connecting surface 130 may have no effect on the acoustic signals and hence cannot result in false touches, unlike sensors using precisely rounded connecting surfaces to support surface acoustic wave propagation.

In some embodiments, touch sensor 100 may further include mounting material 225 at the outer perimeter of substrate 105 on back surface 125. Mounting material 225 may be, for example, foam mounting tape (such as 3M VHB). In many bezel-less applications, it may be desirable to not only protect transducers 110 and reflective arrays 115, but also to visually hide them for cosmetic reasons. For this reason, touch sensor 100 may include acoustically benign layer 270 as illustrated in FIG. 2C. FIG. 2C shows touch sensor 100 along cross-section AA, as illustrated in FIG. 2A. Acoustically benign layer 270 may be opaque (e.g. black). Reflective arrays 115 and mounting material 225 may be bonded to acoustically benign layer 270 which in turn is bonded to the back surface of substrate 105.

FIG. 3 shows a simplified cross-sectional view of an example touch sensor device 300, which may be a touch monitor, a touch computer, a touch video display, a touch mobile device, and/or any other suitable machine having touch-input functionality. Touch sensor device 300 may include substrate 105, acoustically benign layer 270, transducers 110, mounting material 225, reflective arrays 115, display device 310, touch controller 315, and housing 320, among other things.

Display device 310 may be, for example, a liquid crystal display (LCD), organic light emitting device (OLED) display, electrophoretic display (EPD), vacuum fluorescent, cathode ray tube, and/or any other display component. In some embodiments, display device 310 may provide a graphical user interface compatible with touch inputs. Display device 310 may be positioned such that it is visible through substrate 105, thereby enabling a person viewing front surface 120 of substrate 105 to see display device 310 through substrate 105. In some embodiments, display device 310 may be optically bonded to back surface 125. For example, display device 310 may be bonded to back surface 125 via acoustically benign layer 270 and mounting tape 225. Touch controller 315 may be configured to control transducers 110 and to determine touch coordinates.

Housing 320 may contain and protect display device 310, transducers 110, reflective arrays 115, touch controller 315, as well as other components of the device that are not shown to avoid unnecessarily overcomplicating the drawings. One or more of the components of touch sensor device 300 may be attached via housing 320. In some embodiments, touch sensor 105 may be flush mounted within housing 320 such that front surface 120 is flush with (e.g., at the same height) as the top of housing 320. Furthermore, in some embodiments, substrate 105 may be separate from housing 320 by an air gap 302.

For cosmetic reasons, it is often desirable that acoustically benign layer 270 extend all the way to the edge of substrate 105 at connecting surface 130, as is shown in FIG. 2C. This is more difficult to do in the bezel-less designs using precisely rounded connecting surfaces 130 to support surface acoustic wave propagation because of manufacturing difficulties of applying coatings to non-flat surfaces.

In addition to holding substrate 105 in place, mounting tape 225 may also provide a seal that protects reflective arrays 115 and transducers 110 from dust, water, and other contaminants in the environment. In bezel-less designs using precisely rounded connecting surfaces 130, mounting tape 225 must be inside the reflective arrays 115 (e.g., in an inactive region) to prevent unwanted attenuation of surface acoustic waves caused by mounting tape 225. As such, a separate outer seal is required to protect reflective arrays 115 and transducers 110 from contaminants. For touch sensor 300, because mounting tape 225 may be in an acoustically inactive region of substrate 105 that also serves as a seal, the complexities of designing and manufacturing the outer seal (e.g., to properly interface with rounded connecting surfaces) is avoided. Furthermore, by avoiding the need of the outer seal and by eliminating the added substrate width of rounded connecting surfaces, touch sensor 300 may include decreased border widths relative to conventional bezel-less touchscreen designs.

By avoiding the need of a seal in addition to the mounting tape, and by eliminating the width in plan view of a rounded glass edge, the design of FIG. 2C reduces border width relative to the conventional bezel-less touchscreen designs.

High Sensitivity Lamb Waves

The term "Lamb wave" covers a wide variety of possible waves with widely varying properties depending on choices of substrate thickness d, operating frequency f, and specific choice of Lamb wave mode. As is expected because acoustic power of a Lamb wave is distributed throughout the substrate thickness d rather than bound to one surface like surface acoustic waves, Lamb waves generally have dramatically less sensitivity to touches than surface acoustic waves. However, the inventors have appreciated that under exceptional circumstances Lamb waves may have touch sensitivity approaching surface acoustic wave touch sensitivity. A "high sensitivity Lamb wave," as used herein, refers to Lamb waves of such exceptional circumstances.

One type of high sensitivity Lamb wave is referred to herein as "near-thickness-resonance Lamb wave" or "near-resonance Lamb wave." Near-resonance Lamb waves may be defined with reference to FIG. 4. FIG. 4 shows a plot 400 wherein Lamb wave phase velocity ($V_P$) is plotted as a function of substrate thickness d and operating frequency f. At vertical axis 402, Lamb wave phase velocity ($V_P$) is plotted as computed for a substrate of soda-lime glass with a Poisson's ratio of 0.2638 and for an operating frequency f of 5.53 MHz. Substrate thickness d is given in the horizontal axis 404 labeled "d" and the Lamb wave phase velocity is given in the vertical axis 402 labeled "$V_P$". Vertical axis 406 labeled "$V_P/V_{SHEAR}$" gives Lamb wave phase velocity divided by bulk shear wave velocity of the substrate material $V_{SHEAR}$. Alternate vertical axis 406 is unitless (i.e., has no unit of measurement, but only an absolute value).

Two alternate and unitless horizontal axes 408 and 410 are also included in FIG. 4 by multiplying the substrate thickness "d" by the operating frequency f and then dividing by either the bulk shear velocity $V_{SHEAR}$ and the bulk pressure wave or longitudinal velocity $V_{LONG}$ of the substrate material; this is equivalent to expressing thickness d in units of bulk shear wavelength $\lambda_{SHEAR}$ and longitudinal wavelength $\lambda_{LONG}$, respectively. The curves in FIG. 4 show that the Lamb wave phase velocity ($V_P$) is a function of the frequency-thickness product (e.g., f*d). As such, the curves in FIG. 4 may apply to any operating frequency f and any substrate thickness d by making reference to the alternate and unitless axes 406, 408, and 410. Similar curves apply for any homogeneous substrate material but the exact curve shapes may vary, such as with the value of Poisson's ratio of the substrate material.

With reference to FIG. 4, the lowest order Lamb waves A0 (anti-symmetric) and S0 (symmetric) exist in arbigtrarily thin substrates (d→0). All other Lamb modes exist as propagating modes in a substrate only if the substrate is sufficiently thick. Equivalently (referring to one of the unitless horizontal axes 408 and 410), Lamb modes may exist as propagating modes at a sufficiently high operating frequency f for a given thickness d. In other words, each Lamb mode has its own cut-off thickness (for a given operating frequency) or cut-off frequency (for a given substrate thickness). At cut-off, the Lamb mode phase velocity $V_p$ becomes infinite, the wavelength ($\lambda_{LAMB}$) infinite, which corresponds physically to a thickness resonance of substrate 105 where the phase of the thickness vibration is independent of position within the plane of substrate 105. Conditions providing for high sensitivity Lamb waves exist when a mode is selected that is close to its cut-off value, or more quantitatively, when the Lamb wave phase velocity $V_p$ is more than three times the surface acoustic wave velocity $V_{SAW}$, as shown at 412. In other words, high sensitivity Lamb waves may exist above the dashed line labeled "$3V_{SAW}$."

However, not all Lamb modes close to cut-off are high sensitivity Lamb waves. All cut-off values correspond to an integer or half-integer value on one of the two unitless horizontal axes 408 and 410 of FIG. 4. Equations 2 and 3A below give the values of cut-off thicknesses corresponding to integer or half-integer values on the first and second unitless horizontal axes, respectively:

$$d_{CUT-OFF}=(k/2)\cdot(V_{SHEAR}/f)=(k/2)\cdot\lambda_{SHEAR} \quad \text{Equation 2,}$$

$$d_{CUT-OFF}=(m/2)\cdot(V_{LONG}/f)=(m/2)\cdot\lambda_{LONG} \quad \text{Equation 3A,}$$

where k and m are any integers. In FIG. 4, dashed curves correspond to Lamb modes with cut-off thicknesses equal to integer multiples of half the shear wavelength $\lambda_{SHEAR}$ and solid curves correspond to Lamb modes with cut-off thickness equal to integer multiples of half the longitudinal wavelength $\lambda_{LONG}$. Lamb modes near their cut-off are only "high sensitivity" if their cut-off thickness is an integer multiple of half the longitudinal wavelength $\lambda_{LONG}$. Such lamb modes are referred to herein as "near-longitudinal-resonance lamb waves." Graphically, this corresponds to Lamb waves associated with portions of the solid curves above the $3V_{SAW}$ threshold line. As such, near-longitudinal-resonance Lamb waves may refer to Lamb waves where $d_{CUT-OFF}=(m/2) \cdot \lambda_{LONG}$, where m=1, 2, 3, etc., and with phase velocity $V_p$ greater than three times the SAW velocity $V_{SAW}$.

At the longitudinal thickness resonance, Lamb waves having zero group velocity are of little use for propagation across a touch area. Thus for a near-longitudinal-resonance Lamb wave corresponding to integer m, a substrate thickness greater than the cut-off thickness is desired. However it is not desired to have a substrate thickness too much thicker than the cut-off thickness. The thickness is too much thicker if it no longer meets the near-longitudinal-resonance condition of a phase velocity more than three times the SAW velocity. Inspection of FIG. 4 shows that if the near longitudinal resonance condition is met, it is quite likely that the substrate thickness is less than (5/4) times the cut-off thickness. To summarize, in some embodiments, a preferred substrate thickness d may satisfy the inequalities of Equations 3b and 3c:

$$d > (m/2) \cdot (V_{LONG}/f) = (m/2) \cdot \lambda_{LONG} \quad \text{Equation 3b,}$$

$$d \leq (5/4) \cdot (m/2) \cdot (V_{LONG}/f) = (5/4) \cdot (m/2) \cdot \lambda_{LONG} \quad \text{Equation 3c.}$$

Lamb modes near their cut-off are not "high sensitivity" if their cut-off thickness is an integer multiple of half the shear wavelength $\lambda_{SHEAR}$. Such lamb modes are also referred to herein as "near-shear-resonance Lamb waves." As stated above, not all Lamb modes close to cut-off are high sensitivity Lamb waves.

The dot-dashed curves in FIG. 4 correspond to shear plate-wave modes. For soda-lime glass with a Poisson's ratio of 0.2638, the near-resonance Lamb waves correspond to modes S1, A3, S4, A6, S7, etc. Table 500 shown in FIG. 5A gives numerical values of cut-off thickness in units of millimeters. Near-longitudinal-resonance Lamb waves, with cut-off thicknesses of the form $d_{CUT-OFF}=(m/2) \cdot \lambda_{LONG}$, are shown in underline. Table 570 shown in FIG. 5C gives numerical values of cut-off for frequency thickness product in units of MegaHertz-millimeters. The numbers in FIG. 5C are the values in FIG. 5A multipled by the operating frequency of 5.53 MHz. If operating frequency f is not 5.53 MHz for a soda-lime glass substrate with a Poisson's ratio of 0.2638, then Table 570 of FIG. 5C may be used to determine cut-off thicknesses for any chosen operating frequency f.

Table 550 shown in FIG. 5B is similar to Table 500 except that results are presented for an alternate substrate material with a Poisson's ratio of 0.2100. In this case, the near-thickness-resonance Lamb waves correspond to modes S1, A3, S4, A5, S7, A8, etc. Tables 500 and 550 show that the substrate material (e.g., the Poisson's ratio) may result in different near-longitudinal-resonance Lamb wave modes. For example, the $d_{CUT-OFF}=$LONG (e.g., where m is equal to 4 in Equation 3) in Table 550 is now A5 rather than A6 as in the soda-lime glass example of Table 500.

To gain insight into the source of the relatively high touch sensitivity of near-longitudinal-resonance Lamb waves of FIG. 4 and Tables 500 and 550, consider in more detail the S4 and A4 modes. FIG. 6A illustrates a snapshot of an S4 near-longitudinal-resonance Lamb wave such as may be used in touch sensor 100. As this S4 Lamb wave propagates from left to right, an atom on the front surface of the substrate may move in an elliptical motion and in sequence cycle between small forward horizontal motion, large downward vertical motion, and small backward horizontal motion, large upward vertical motion (see particle velocity arrow labeled 602), and then back to a small forward horizontal motion (see particle velocity arrow labeled 604). On the touched surface of the substrate, surface motion may be much stronger perpendicular to the surface than within the plane of the surface.

In the cut-off limit, this S4 Lamb wave becomes the thickness resonance illustrated in FIG. 6B with surface motion entirely perpendicular to the surface with no motion in the plane of the surface (see particle velocity arrow labeled 606). As S4 motion is entirely perpendicular to the surface at cut-off, it follows that S4 motion will be dominantly perpendicular to the surface close to cut-off. In contrast, as indicated by the particle velocity arrow labeled 608 in FIG. 6C, at cut-off, A4 becomes a shear mode thickness resonance with surface motion entirely within the plane of the surface and hence there is only weak perpendicular surface motion for A4 near cut-off.

Large vertical or perpendicular surface motion may be associated with higher touch sensitivity. The high sensitivity of surface acoustic wave touchscreens (e.g., that use surface acoustic waves in the touch region) to touches is due to the radiation damping mechanism (e.g., emission of pressure waves into finger flesh) which depends on perpendicular surface motion. The much lower touch sensitivity (in units of dB signal reduction) of shear touchscreens (e.g., that use shear waves in the touch region) is due to the fact that its surface motion is only in the plane of the surface and hence touch induced attenuation depends on a viscous damping mechanisms that are much weaker than the radiation damping mechanism. As such, high sensitivity Lamb waves or near-longitudinal-resonance Lamb waves may have relatively large perpendicular surface motion compared with surface motion within the plane of the surface.

Returning to FIGS. 5A and 5B, with the addition of the parenthetical entries in Tables 500 and 550, and if the tables were extended to arbitrarily large n, then the table may provide cut-off values for all acoustic modes in the plate substrate, that is all plate modes. As illustrated in FIG. 4, for substrate thickness d greater than about 3 bulk shear wavelengths $\lambda_{SHEAR}$ (e.g., as shown at 414), the S0 and A0 phase velocities closely converge on the surface acoustic wave velocity $V_{SAW}$; and in fact quasi-Rayleigh waves or surface acoustic waves can be mathematically shown to be superpositions of S0 and A0 Lamb waves. For this reason "(SAW)" has been added to the n=0 entries of the tables. The table entries "(SH1)", "(SH2)", "(SH3)", etc. represent different orders of transverse shear plate waves. For example "SH3" represents a third order shear plate wave having three node planes. The "SH5" shear plate wave has five node planes at different depths into the substrate and at cut-off where it becomes a thickness resonance of constant phase through the substrate area.

FIG. 6C may represent the cut-off limit of both the shear plate wave SH5 as well as the Lamb wave A4, the only difference is that the Lamb wave propagation direction (above cut-off) is parallel to the arrows in FIG. 6C for the A4 Lamb wave while the shear wave propagation direction (above cut-off) is perpendicular to the arrows (in or out of plane of paper) in FIG. 6C for the SH5 shear plate wave. The fact that the A4 Lamb and SH5 shear modes have the same cut-off thickness-resonance limit (aside from a 90° rotation) corresponds to the fact that these two modes share the same cut-off value. Similarly all other shear plate modes have a cut-off value shared with a Lamb mode. This is shown explicitly with the parenthetical entries in Tables 500 and 550. The only plate mode not appearing in tables 500 and 550 is lowest order shear plate wave SH0 which (like A0 and S0) has a cut-off value of zero.

As discussed above, the values in Tables 500 and 550 are for a nominal operating frequency f of 5.53 MHz and can be scaled for other operating frequencies. For examples, the entries may be multiplied by 5.53 MHz and then divided by the desired operating frequency (e.g., so as to keep the frequency-thickness product constant). Tables 500 and 550 correspond to two specific choices of Poisson's ratio (0.2638 and 0.2100, respectively) and can be recomputed for other values of Poisson's ratio. Table 570 corresponds to the same Poisson's ratio of 0.2638 as Table 500.

Tables of this sort are of value not only for selecting a desired high sensitivity Lamb mode, but also gaining insights on the threat of parasitic or spurious signals from other modes. For example, Table 500 identifies S4 as a potentially interesting high sensitivity Lamb mode in soda-lime glass. FIG. 4 shows that a thickness of d=1.8 mm is sufficiently close to cut-off for the S4 Lamb wave phase velocity to exceed three times the SAW velocity. And in Table 500, the thickness d=1.8 mm is below cut-off for Lamb modes S5, S6, S7, etc. and Lamb modes A5, A6, A7, etc. as well as shear modes SH6, SH7, SH8, etc. Hence, none of these modes can propagate in a 1.8 mm thickness soda-lime glass substrate at 5.53 MHz and are eliminated as sources of parasitic signals at that operating frequency.

In contrast, the A4 Lamb wave and SH5 shear wave will propagate in 1.8 mm glass at 5.53 MHz as will other modes in Table 500 to the left of S4. If, for example, the acoustic path segment 150 of sensor 100 is desired to be the S4 Lamb mode at 5.53 MHz in 1.8 mm soda-lime glass while the acoustic path segments 140 and 160 along the arrays to be surface acoustic waves, then the reflector elements in reflective arrays 115 may be not an angle of 45° (e.g., as seen in touch sensors without acoustic mode conversion, such as SAW-SAW-SAW sensors) but rather oriented at the reflector angle θ (e.g., the angle θ between the reflector element 116 and the direction of the acoustic path 140 shown in FIG. 2B, and given by Equation 1) satisfying:

$$\tan(\theta) = V_{S4}/V_{SAW}$$ Equation 4, where $V_{S4}$ is the phase velocity $V_p$ of the S4 Lamb wave mode.

In some embodiments, the reflector angle θ may be configured to satisfy the high sensitivity Lamb condition (e.g., when $V_{S4}/V_{SAW}>3$). Here, reflector angle θ is greater than 71°, such as shown in FIG. 2B. The arrays may be selected in view of the large phase velocity of the S4 mode (e.g., relative to $V_{SAW}$) via the large reflector angle θ, as tuned for coherent scattering of surface acoustic wave to S4 Lamb mode wave. Lamb wave modes with phase velocity $V_P$ well below 3 $V_{SAW}$ will not scatter coherently and be strongly suppressed, and this will be the case for modes with cut-off values far from d=1.8 mm, namely S0, S1, S2, S3, A0, A1, A2, A3, SH0, SH1, SH2, SH3, and SH4. As such, modes A4 and SH5 may be the most serious potential parasites.

Unlike S4 that is near the thickness resonance with vertical motion as illustrated in FIG. 6B, both A4 and SH5 are near a thickness resonance with horizontal motion as illustrated in FIG. 6C. Hence the "polarization" or direction of motion for the desired S4 modes is dominantly perpendicular to the surface of substrate 105 and differs from the polarization directions of A4 and SH5 which are dominantly in the plane of the surface of substrate 105. In fact, it may be generally the case (e.g., for many suitable substrate materials) that there will be this difference in polarization between a near-longitudinal-resonance Lamb wave and the most serious potential parasites with similar cut-off values. This is because the near-longitudinal-resonance Lamb waves, such as illustrated with solid curves in FIG. 4, have dominantly perpendicular polarization near cut-off and furthermore these near-longitudinal-resonance Lamb waves have well separated cut-off values (separated by at least 0.5 units of horizontal axis 410 of FIG. 4). As discussed in the next paragraph, this difference in polarization between the selected high-sensitivity near-thickness-resonance Lamb mode and parasitic modes nearest in phase velocity can be used to suppress the parasitic modes to the selected high sensitivity Lamb mode.

The detailed mechanism of scattering of acoustic waves between acoustic path segments 140 and 150, and between acoustic path segments 150 and 160 may depend strongly on the polarizations of the waves involved as well as the materials used in the construction of reflective arrays 115. In various embodiments, the reflective arrays 115 may be fabricated by sintering of a ceramic material such as glass frit, or by UV curing, thermally curing or chemically curing a polymer material loaded with an inorganic materials, or by forming grooves via chemical etching or laser ablation. These different reflective array material options may affect the amplitudes of the desired and parasitic waves differently. By using different reflector material options, it may be possible to further suppress undesired parasitic modes. In various embodiments, for example, the reflector elements of reflective arrays 115 may be formed of glass frit, ceramic material, a loaded polymer material and etched grooves.

Anti-Dispersion

As discussed above, touch event detection may be performed by a controller (e.g., touch controller 315 shown in FIG. 3) that generates an electrical excitation signal having an operational frequency f. Surface acoustic waves and Lamb waves that are generated from the electrical excitation signal also have the operational frequency f. In application, however, using electrical excitation signal of finite duration, as well as seeking touch induced signal perturbations of finite duration, may cause the touch detecting signal to have a finite bandwidth, that is, a non-zero frequency spread Δf. Lamb waves may have different group velocities $V^G_{LAMB}$ within frequency spread Δf, which may result in unreliable touch location detection caused by dispersion of the Lamb wave (e.g., as different frequencies of the Lamb Wave propagates through substrate 105 at different group velocities $V^G_{LAMB}$).

In some embodiments, touch controller 315 may include anti-dispersion electronics configured to compensate for dispersion. One "anti-dispersion" approach to address Lamb wave dispersion is to use digital signal processing of the received signal to make corrections to compensate or eliminate the effects of dispersion. This approach may use electronics that digitize not only the magnitude of the received signal, but also digitizes its phase, or equivalently digitizes the complete RF waveform and not just its envelop. Examples of processing the received signal, applicable to some embodiments, are discussed in greater detail in U.S. Pat. No. 5,854,450, titled "Acoustic Condition Sensor Employing a Plurality of Mutually Non-orthogonal Waves," which is incorporated by reference in its entirety herein.

In some embodiments, touch controller 315 may be configured to anti-disperse the electrical excitation signal that drives a transmitting transducer (e.g., transducer 110a shown in FIG. 2B). $S_T(t)$ may be defined as the electrical excitation signal driving the transmitting transducer and $S_T(\omega)$ may be its Fourier transform such that:

$$S_T(t) = \{1/\sqrt{(2\pi)}\} \cdot \int S_T(\omega) \cdot e^{i\omega t} d\omega$$

For a specific SAW-Lamb-SAW acoustic path such as illustrated in FIGS. 2A and 2B as acoustic path segments 140, 150 and 160, $S_R(t)$ may be defined as the corresponding component of the received signal and $S_R(\omega)$ be its Fourier transform such that:

$$S_R(t) = \{1/\sqrt{(2\pi)}\} \cdot \int S_R(\omega) \cdot e^{i\omega t} d\omega$$

If the Lamb wave along acoustic path segment 150 (and the surface acoustic wave or other wave along acoustic path segments 140 and 160) are completely non-dispersive, then the received signal $S_R(t)$ would have exactly the same time dependence of the transmitted signal $S_T(t)$ except for a time delay $T_{DELAY}$ and an attenuation A. Stated mathematically we have the following equation for the no-dispersion condition:

$$S_R(t) = A \cdot S_T(t - T_{DELAY})$$

With further mathematical manipulation, we have the following:

$$\{1/\sqrt{(2\pi)}\} \cdot \int S_R(\omega) \cdot e^{i\omega t} d\omega = S_R(t) = A \cdot S_T(t - T_{DELAY}) = A \cdot \{1/\sqrt{(2\pi)}\} \cdot \int S_T(\omega) \cdot e^{i\omega(t - Tdelay)} d\omega = \{1/\sqrt{(2\pi)}\} \cdot \int \{A \cdot S_T(\omega) \cdot e^{-i\omega Tdelay}\} \cdot e^{i\omega t} d\omega$$

The equality of the extreme right and left sides of the equation above provides the no-dispersion condition in the frequency domain:

$$S_R(\omega) = A \cdot S_T(\omega) \cdot e^{-i\omega Tdelay}$$

When there is dispersion, frequency dependent phase errors $\delta\phi(\omega)$ may be introduced so that the no-dispersion condition fails, that is $S_R(t) \neq A \cdot S_T(t - T_{DELAY})$ or:

$$S_R(\omega) = A \cdot S_T(\omega) \cdot e^{i\delta\phi(\omega)} \cdot e^{-i\omega Tdelay}$$

where $\delta\phi(\omega) \neq 0$.

Referring to FIGS. 2A and 2B, for many SAW-Lamb-SAW embodiments, there may be little or no dispersion in the surface acoustic wave paths corresponding with path segments 140 and 160 and a fixed Lamb path length (e.g., as fixed by substrate size) corresponding to path segment 150. (Alternatively, rather than SAW-LAMB-SAW, one may also consider a LAMB'-LAMB-LAMB' touch sensor where the touch sensing Lamb wave is selected for high touch sensitivity and the Lamb' mode along paths 440 and 460 are selected for low dispersion.) Because the Lamb path length over which dispersion occurs is of fixed length (e.g., path segment 150) independent of the touch coordinate, the same dispersive phase error $\delta\phi(\omega)$ may apply to the entire duration of the received signal.

In various embodiments, $\delta\phi(\omega)$ may be pre-determined by experiment or theoretically from design. Next, an "anti-dispersed" electrical excitation signal $S'_T(\omega)$ may be defined such that:

$$S'_T(\omega) = e^{-i\delta\phi(\omega)} \cdot S_T(\omega) \quad \text{Equation 5,}$$

where $S_T(\omega)$ is the Fourier transform of the non-anti-dispersed electrical excitation signal $S_T(t)$. In other, in some embodiments, controller 315 may be configured to generate the anti-dispersed electrical excitation signal $S'_T(\omega)$ to correct for dispersion.

If the received signal is defined as $S'_R(t)$, if follows from Equation 5 that:

$$S'_T(t) = \{1/\sqrt{(2\pi)}\} \cdot \int S'_T(\omega) \cdot e^{i\omega t} d\omega = \{1/\sqrt{(2\pi)}\} \cdot \int e^{-i\delta\phi(\omega)} \cdot S_T(\omega) \cdot e^{i\omega t} d\omega S'_R(\omega) = A \cdot S'_T(\omega) \cdot e^{i\delta\phi(\omega)} \cdot e^{-i\omega Tdelay} = A \cdot S_T(\omega) \cdot e^{-i\delta\phi(\omega)} \cdot e^{i\delta\phi(\omega)} \cdot e^{-i\omega Tdelay} = A \cdot S_T(\omega) \cdot e^{-i\omega Tdelay}$$

$S'_R(\omega)$ is equal to $A \cdot S_T(\omega) \cdot e^{-i\omega Tdelay}$ which is exactly that value of $S_R(\omega)$ in the non-dispersion case. Hence by using the anti-dispersed excitation signal, the received signal at the receiving transducer will be dispersion corrected as shown by:

$$S'_R(t) = \{1/\sqrt{(2\pi)}\} \cdot \int S'_R(\omega) \cdot e^{i\omega t} d\omega = \{1/\sqrt{(2\pi)}\} \cdot \int A \cdot S_T(\omega) \cdot e^{-i\omega Tdelay} \cdot e^{i\omega t} d\omega = A \cdot S_T(t - T_{DELAY})$$

In some embodiments, where acoustic path segments 140 and 160 of touch sensor 300 are also dispersive, then the phase error becomes dependent on the touch coordinate and delay time of the acoustic path. The delay time independent phase error $\delta\phi(\omega)$ in Equation may be replaced by a delay time dependent phase error $\delta\phi(\omega, T_{DELAY})$. To correct for this delay time dependence of the phase error, two excitation signals may be used to accurately measure a touch coordinate, such as using a first excitation pulse without anti-dispersion to approximately determine a location of a touch and hence an approximate value of $T_{DELAY}$ with which to determine $\delta\phi(\omega, T_{DELAY})$ for use in a second excitation pulse that is anti-dispersed. As such, the anti-dispersed electrical excitation signal $S'_T(\omega)$ may be defined such that:

$$S'_T(\omega) = e^{-i\delta\phi(\omega, T_{DELAY})} \cdot S_T(\omega) \quad \text{Equation 6,}$$

where $S_T(\omega)$ is the Fourier transform of the non-anti-dispersed electrical excitation signal $S_T(t)$. Alternately and/or additionally, the anti-dispersed excitation bursts may be repeated for a set of values for $T_{DELAY}$ so that every possible touch location is probed with at least one signal that is approximately corrected for dispersion.

In some embodiments, generation of anti-dispersed excitation signal $S'_T(t)$ may be accomplished with the aid of a Digital-to-Analog-Converter (DAC) with a conversion rate significantly higher that the touchscreen operating frequency f, preferably higher than about four times the touchscreen operating frequency f. For example, for a touchscreen operating frequency f of 5.53 MHz, a DAC conversation rate of 22 MHz or higher may be used.

In some embodiments, high sensitivity Lamb waves with sufficiently little dispersion may be used instead of, or in addition to, anti-dispersed excitation signals. For example, it may be desirable to minimize the demands on anti-dispersion features added to either the transmit excitation circuit or the receive signal circuit. Furthermore, in some embodiments, it may be desirable to avoid entirely the added complexity of such anti-dispersion correction technology. For example, it may be desirable to use controllers that are the same as or similar to present day commercial controller products that do not digitize received signal phase information or enable anti-dispersion modifications of excitation signals. For such embodiments, it may desirable to select a high sensitivity Lamb wave with sufficiently little dispersion.

FIG. 7 shows a plot 700 that reproduces a portion of the S4 phase velocity curve shown in FIG. 4. Here, the horizontal axis 702 is expressed in terms of varying frequency f or a fixed soda-lime glass substrate of thickness d=1.8 mm. As shown at 704, the phase velocity $V_P$ of the S4 Lamb wave varies rapidly with frequency in the high sensitivity region above $3V_{SAW}$.

A nominal operating frequency f is represented by the heavy vertical dashed line at 706, which in FIG. 7 is shown at the value of f=5.53 MHz. For example, the numerical value of the operating frequency may correspond to a reference clock frequency used to generate an excitation tone burst, which itself has a frequency spread around the operating frequency. The frequency spread Δf around operating frequency f is shown at 708, and may typically include frequencies within a few percent of operating frequency f. As a specific example, FIG. 7 shows frequency spread Δf being 3% or ±1.5% of operating frequency f, which may correspond to a touch sensor with an excitation tone burst of 30 RF cycles. The S4 Lamb wave group velocity $V^G_{LAMB}$ varies within this frequency range Δf as shown at 710.

As discussed above, touch coordinates may be determined by measuring time delays that are determined in part by wave velocities. Referring to FIG. 2B, a delay time T may be defined for an acoustic path including path segment 140 of length X, path segment 150 of length L and path segment 160 of length X. X may correspond with the horizontal coordinate (e.g., X-coordinate) of a touch on path segment 150. Furthermore, the acoustic mode on path segments 140 and 160 may be surface acoustic waves. It follows that the delay time T may be given by the following, where $V_{SAW}$ is the SAW velocity and $V^G_{LAMB}$ is the group velocity of the Lamb wave of path segment 150:

$$T=2*X/V_{SAW}+L/V^G_{LAMB}$$

If a touch has a width ΔX, then the touch's finite width will correspond to a spread in delay times given by:

$$\Delta T_{TOUCH}=2*\Delta X/V_{SAW}$$

When the Lamb wave group velocity $V^G_{LAMB}$ varies over the frequency range Δf, there may be another contribution to delay time spread whose absolute magnitude is given by the following formula:

$$\Delta T_{DISPERSION}=(L/V^G_{LAMB})*|d(\ln(V^G_{LAMB})/d(\ln(f))|*(\Delta f/f)$$

where $(L/V^G_{LAMB})$ is the propagation time for acoustic path segment 150, $|d(\ln(V^G_{LAMB})/d(\ln(f)|$ is the magnitude of a unit-less derivative involving natural logarithms that may be interpreted as the percent change in Lamb wave group velocity per percent change in frequency.

If delay time spread caused by Lamb wave dispersion $\Delta T_{DISPERSION}$ is small compared to the time spread caused by the width of the touch $\Delta T_{TOUCH}$, then dispersion may have little practical effect on touch sensor operation. This small dispersion condition may be expressed in the following inequality:

$$\Delta T_{TOUCH}/\Delta T_{DISPERSION} \leq 1, \text{ or equivalently,}$$

$$(½)·(L/\Delta X)·(V_{SAW}/V^G_{LAMB})·|d(\ln(V^G_{LAMB})/d(\ln(f))|·(\Delta f/f) \leq 1 \qquad \text{Equation 7.}$$

This small dispersion condition can also be expressed as follows:

$$(V_{SAW}/V^G_{LAMB})·|d(\ln(V^G_{LAMB})/d(\ln(f))| \leq 2·(\Delta X/L)/(f/\Delta f) \qquad \text{Equation 8.}$$

In a numerical example applicable to some embodiments, ΔX=12 mm (e.g., the size of a typical touch), L=200 mm and Δf/f=3%, the small dispersion condition of Equations 7 and 8 becomes:

$$(V_{SAW}/V^G_{LAMB})·|d(\ln(V^G_{LAMB})/d(\ln(f))| \leq 4 \qquad \text{Equation 9.}$$

The small dispersion condition of Equations 7, 8 and 9 involve not the Lamb wave phase velocity $V_P$, but rather the Lamb wave group velocity $V^G_{LAMB}$. While it is the phase velocity $V_P$ that is relevant for coherent scattering analysis such as the choice of orientation of the reflectors of arrays 115, it is the group velocity $V^G_{LAMB}$ that determines propagation delay times for acoustic paths such as path segment 150.

The dotted curve in FIG. 7 at 710 plots the S4 Lamb wave group velocity $V^G_{LAMB}$ as a function of frequency. As shown, the S4 Lamb mode group velocity curve at 710 has an inflection point in the frequency region in which the phase velocity $V_P$ satisfies the high sensitivity condition of exceeding $3V_{SAW}$ at 712. At the inflection point, the frequency dependence of velocity, $|d(\ln(V^G_{LAMB})/d(\ln(f))|$, has a minimum with a value represented by the slope of tangent line 714. As such, the group velocity $V^G_{LAMB}$ has a low frequency dependence within the frequency spread Δf around f at 5.53 MHz. In some embodiments, it may be advantageous to select a high sensitivity Lamb wave that is near a group velocity inflection point. In other words, the operating frequency f may be selected to be near the inflection point of group velocity $V^G_{LAMB}$ as a function of the varying frequencies.

For example, as shown in FIG. 7, the S4 Lamb wave in 1.8 mm thick soda-lime glass is near a group velocity inflection point at an operating frequency f of 5.53 MHz. At a nominal operative frequency of 5.53 MHz shown at 706, the S4 group velocity curve in FIG. 7 has a velocity dispersion value of $|d(\ln(V^G_{LAMB})/d(\ln(f))|=1.8$ and a group velocity of $V^G_{LAMB}$ equal to about half the surface acoustic wave velocity $V_{SAW}$ so that the left side of the Equation 9 is about 3.6, thus meeting the small dispersion condition.

High-Sensitivity Lamé Type Lamb Waves

In some embodiments, touch sensor 300 may be configured to utilize near-Lamé waves, or Lamb wave modes that are Lamé waves or are close to being Lamé waves. Similar to Lamb waves at longitudinal-resonance (e.g., as shown in FIG. 6B), Lamé wave motion at the substrate surface is purely perpendicular to the surface with no motion in the plane of the surface. As perpendicular motion provides more touch sensitivity than in-plane motion, near-Lamé waves having predominantly perpendicular motion are also an example of high sensitivity Lamb waves. Some embodiments may include LAME-LAME-LAME touch sensors in which path segments 140, 150 and 160 shown in FIGS. 2A and 2B are near-Lamé waves (e.g., no surface acoustic path segments). For example, the desired lower order Lamé waves may utilize a substrate thickness d that is too small to support reliable surface acoustic wave propagation. As such, in some embodiments, Lamé waves may be used with thinner substrates than would be suitable for surface acoustic waves at the same frequency.

Lamé waves may be defined as a special case of Lamb waves. As illustrated in FIG. 8, one way to describe a Lamé wave is as a vertically polarized bulk shear wave propagating in a 45° direction relative to the plane of substrate 805 that is repeatedly reflected by the top surface 820 and bottom surface 825 of substrate 805. The dashed lines in FIG. 8 represent propagation and reflection of such bulk shear waves and the short double arrows illustrate the polarization or particle motion associated with the propagating bulk shear waves.

FIG. 9A shows a plot 900 in which phase velocity $V_P$ in meters per second is plotted at 902 against the product of operating frequency f and substrate thickness d at 904 for several lower order Lamb waves. From the 45° propagation direction shown in FIG. 8, the phase velocity $V_P$ of Lamé waves may be given by:

$$V_P = (\sqrt{2}) \cdot V_{SHEAR}$$

where $V_{SHEAR}$ is the bulk shear wave velocity. A horizontal solid line 906 corresponding to the phase velocity $(\sqrt{2}) \cdot V_{SHEAR}$ is shown in FIG. 9A. The intersection of horizontal line 906 and the S0 Lamb mode curve is indicated by arrow 908 and corresponds to the lowest order Lamé mode, which is referred to herein as the "S0/Lamé" wave. Similarly, the other arrows to the right of arrow 908 correspond to the A1/Lamé, S1/Lamé, A2/Lamé, and S2/Lamé modes, respectively. Because Lamb wave properties vary continuously as the frequency-thickness product f*d varies, near-Lamé modes (e.g., in f*d values) corresponding to the Lamé modes indicated by the arrows in FIG. 9A will also have dominantly perpendicular surface motion, and hence high touch sensitivity.

In other words, Lamé modes may exist when the substrate thickness $d_{LAME}$ is related to shear wavelength $\lambda_{SHEAR}$ as follows:

$$d_{LAME} = p \cdot \lambda_{SHEAR}/\sqrt{2}$$ Equation 10, where p is an integer. This Lamé mode condition can be reexpressed in terms of the operating frequency f and the bulk shear wave velocity $V_{SHEAR}$ as follows:

$$f \cdot d_{LAME} = p \cdot V_{SHEAR}/\sqrt{2}$$ Equation 11, where p is an integer. In some embodiments, a "near-Lamé" wave may be defined as a Lamb mode that would become a Lamé mode if either the operating frequency f or the substrate thickness d were increased or decreased by 20%, or less, from their Lamé mode condition values as expressed in Equations 10 and 11, respectively.

In some embodiments, the touch sensor may use near-Lamé waves with low dispersion. FIG. 9B shows a plot 950 in which group velocity $V^G_{LAMB}$ in meters per second is plotted at 952 against the product of operating frequency f and substrate thickness d at 954 for several lower order Lamb waves. The arrows in FIG. 9B correspond to locations where the dispersion of the group velocity $V^G_{LAMB}$ is zero, namely $d(\ln(V^G_{LAMB}))/d(\ln(f)) = 0$. This has the beneficial consequence that there is little or no smearing of the measured touch delay time due to frequency dispersion of the Lamb wave, that is, $\Delta T_{DISPERSION} = 0$. Inspection of FIGS. 9A and 9B reveals that the frequency-thickness values f*d of minimum dispersion in FIG. 9B correspond closely to the six Lamé modes indicated in FIG. 9A. Thus the combined benefits of low dispersion and perpendicular surface motion may be provided by Lamé modes or near-Lamé waves.

Table 1000 in FIG. 10 shows calculated touch sensitivities for the Lamé waves of FIG. 9A and FIG. 9B relative to surface acoustic waves at the same operating frequency f (and substrate thick enough to support surface acoustic wave propagation). As shown by the non-parenthetical values, the S0/Lamé and A1/Lamé waves have touch sensitivities within about a factor of about two of surface acoustic wave touch sensitivity. As seen in Table 1000, the touch sensitivity relative to surface acoustic wave decreases as the mode order increases, but nevertheless the five lowest order Lamé modes (e.g., S0, A1, S1, A2 and S2) are all within a factor of about five of surface acoustic wave touch sensitivity and thus may qualify as high sensitivity Lamb waves and be used as such.

FIG. 11 shows a plot 1100 in which the phase velocity $V_P$ and group velocity $V^G_{LAMB}$ (or $V_g$ as shown in FIG. 11) for the S0 Lamb mode in soda-lime glass is plotted at 1102 against the product of operating frequency f and substrate thickness d at 1104 for the S0/Lamé mode. The S0/Lamé mode corresponds in FIG. 11 to the intersection at 1106 of the dot-dashed horizontal line 1108 labeled "$V_{Lame}$" and the solid group velocity line 1110, where the frequency-thickness product value is 2.4 MHz*mm. In contrast, the point of minimum dispersion at 1112, corresponds to a slightly higher frequency-thickness product value of 2.6 MHz*mm. The parenthetical values in Table 1000 correspond to relative touch sensitivities calculated for near-Lamé Lamb modes at the minimum dispersion points (e.g., as shown by the arrows in FIG. 9B), such as 2.6 MHz*mm for the S0/Lamé mode. As shown in Table 1000, these parenthetical values may be similar to the non-parenthical values, and as such, near-Lamé waves at the minimum dispersion points may also have touch high sensitivity.

As discussed above, FIGS. 9A, 9B, 10 and 11 are for a soda-lime glass substrate with a Poisson's ratio of 0.2638. In various embodiments, the techniques discussed herein may be applicable to other choices of substrate material (e.g., with differing Poission's ratio) with qualitatively similar effects.

Thin Substrates Using Lamb Waves

In some embodiments, acoustically benign layer 270 (e.g., on which reflective arrays 115 and transducers 110 may be disposed, and as shown in FIGS. 2C and 3) may be an acoustically beneficial layer that allows surface acoustic waves (e.g., along path segments 140 and 150) to propagate on the bottom substrate surface without transferring to the top substrate surface. As such, substrate 105 may have a thinner thickness d than would be normally required to support reliable surface acoustic wave propagation.

FIGS. 12A and 12B illustrate an advantage SAW-LAMB-SAW sensors may have over SAW-SAW-SAW sensors in some embodiments (e.g., bezel-less sensor designs). As discussed above, the penetration depth of surface acoustic waves limits their use to substrates having thicknesses d sufficiently large to support surface acoustic wave propagation, or "SAW substrates." A common rule of thumb is that the thickness d of a SAW substrate must be at least three to four times the surface acoustic wave wavelength $\lambda_{SAW}$. Where thinner and lighter product designs are preferable, the use of surface acoustic waves may present a disadvantage.

At first glance one might assume that the minimum acceptable substrate thickness d for SAW-LAMB-SAW sensors would be the same as for SAW-SAW-SAW sensors, after all, both must be thick enough to support surface acoustic waves. However, this may not be the case when acoustically beneficial layer 1202, as shown in FIG. 12B, is provided. For reasons explained below, acoustically beneficial layer 1270 may enable surface acoustic waves to propagate well in a thinner substrate (e.g., along path segments 140 and 160 that include acoustically beneficial layer 1270) than is needed to propagate surface acoustic waves along acoustic path segment 150 in touch region 205, where acoustically beneficial layer 1270 (e.g., being opaque) may not be extended.

FIG. 12A shows that when substrate 1205 is too thin, surface acoustic waves propagating on top surface 1220 and bottom surface 1225 of substrate 1205 form a pair of coupled identical oscillators resulting in a beat pattern as surface acoustic wave energy oscillates between top surface 1220 and bottom surface 1225. This effect can result in uneven and reduced touch sensitivity, such as within the touch region of a SAW-SAW-SAW sensor.

In FIG. 12B, acoustically beneficial layer 1270 is disposed between substrate 1205 and transducer 1210 and the reflective arrays (not shown). Depending on the material used to form acoustically beneficial layer 1270, surface acoustic waves on bottom surface 1225 may have a different (e.g., generally slower) phase velocity $V_{SAW}$ than surface acoustic waves on the uncoated top surface 1220. As such, top and bottom surface acoustic waves may be no longer a pair of weakly coupled identical oscillators, thus suppressing beat effects. In some embodiments, reflective arrays 115 may have a similar effect on phase velocity $V_{SAW}$ and may also suppress beat effects In some embodiments, acoustically beneficial layer 1270 and/or reflective arrays 115, via suppressing of beat effects, may allow for reduced substrate thicknesses d in SAW-LAMB-SAW sensors. This is because surface acoustic waves may be only propagated in regions of substrate with acoustically beneficial layer 1270 and/or reflective arrays 115. Hence it is possible to construct SAW-LAMB-SAW sensors using substrates that are too thin for SAW-SAW-SAW sensors. For example, 1.75 mm thick soda-lime is too thin to be a substrate for a SAW-SAW-SAW sensor operating at 5.53 MHz, but not too thin for a SAW-Lamb-SAW sensor operating at the same operating frequency f.

Nature of Touch Differentiation Using Lamb Waves

In some embodiments, near-shear-resonance Lamb waves may be used with near-longitudinal-resonance Lamb waves to provide redundant information to confirm a location of a touch and/or to determine information about the nature of the touch. FIG. 13A shows a plan view of back surface 1325 of substrate 1305 for touch sensor 1300.

In the construction of the SAW-LAMB-SAW sensor, illustrated in FIG. 13A, with operating frequency f of 5.53 MHz, a substrate thickness d of 2.8 mm and reflector elements having reflector angles θ oriented for the use with a near-longitudinal-resonance Lamb mode S7, a weak SAW-A7-SAW signal was observed to be superposed on the intended received SAW-S7-SAW signals. In particular, in addition to the acoustic path from transmitting transducer 1310a along path segment 1340, with scattering via reflective array 1315A to a Lamb S7 path segment 1350 across the touch region to reflective array 1315B, with mode conversion back to surface acoustic wave and scattering along path segment 1360 to receiving transducer 1310b, there also is an alternate acoustic path that is identical except that Lamb S7 path segment 1350 is replaced by a Lamb A7 acoustic path segment 1352 (shown as a dotted line with a slight offset so that it can be seen in the FIG. 13A). It was found that the phase velocities $V_P$ of S7 and A7 were sufficiently similar that SAW-A7 scattering at 90° occurred even with the reflector angles θ of reflective arrays 1315 designed for the S7 phase velocity. This resulted in a measureable SAW-A7-SAW signal.

In some embodiments, the SAW-A7-SAW component of the signal received at transducer 1310b may be considered an undesired parasitic signal and touch sensor 1300 may be designed to suppress it. However, in other embodiments, the SAW-A7-SAW signal may be considered a desired secondary signal that provides additional redundant information to confirm a location of a touch and with which to determine information about the nature of the touch.

FIG. 13B shows a plot 1350 of return signal 1302 at transducer 1310b for touch sensor 1300, where signal amplitude is plotted at 1304 and time is plotted at 1306. Via attenuation of the S7 Lamb wave, a touch on path segment 1350 may result in a perturbation 1380 in return signal 1302 at a delay time equal to the sum of the propagation times associated with path segments 1340, 1350 and 1360. Via attenuation of the A7 Lamb wave, the same touch also results in a perturbation 1390 of return signal 1302 at a delay time equal to the sum of the propagation times associated with path segments 1340, 1352 and 1360. Because the A7 Lamb wave has a faster group velocity $V^G_{LAMB}$ than the S7 Lamb wave (e.g., for operating frequency f of 5.53 MHz and substrate thickness d of 2.8 mm), the perturbation 1390 caused by touch attenuation of the A7 Lamb wave occurs at an earlier delay time than the perturbation 1380 caused by touch attenuation of the S7 Lamb wave.

In some embodiments, the touch sensor may be designed so that the superposed signals due to SAW-S7-SAW and SAW-A7-SAW are in phase. In this case, the return signal perturbations 1380 and 1390 may take the form of attenuation dips as shown in FIG. 13B in contrast to more complex interference patterns. As discussed above, the S7 Lamb mode is a near-longitudinal-resonance Lamb wave (e.g., near a longitudinal resonance cut-off, such as shown in FIG. 6B for the S4 Lamb mode) and the A7 Lamb mode is a near-shear-resonance Lamb wave (e.g., near a shear resonance cut-off, such as shown in FIG. 6C for the A4 Lamb mode). As a result, pressure wave radiation damping may play a relatively stronger role in touch perturbations of S7 while viscous damping and horizontal shear motion may play a relatively stronger role in touch perturbations of A7. In some embodiments, the ratio of the magnitudes of A7 perturbation 1390 and S7 perturbation 1380 may be determined to provide a measure of the relative strength of viscous shear damping and pressure wave radiation damping of the touching object. This provides a means to probe the acoustical properties of the touch. In some embodiments, perturbation 1390 may cause a signal increase in return signal 1302 rather than the signal decrease shown in FIG. 13B. For example, this may be the case where return signal 1302 is a superposition of two or more interfering signals.

In some examples, differences in the acoustical properties of a bare fingertip and a covered fingertip (e.g., with a latex glove) may be used to determine whether a user is properly gloved when operating a touch interface of a device located in a biohazard area. In another example, a touch sensor may be disposed at the bottom of a drip pan that is placed under a leaking engine of an automobile, where "touches" of interest are caused by liquid drops. If the leaking liquid drops are of low viscosity, such as water from a radiator, then the ratio of touch perturbations 1390 and 1380 will be relatively smaller due to lack of viscous damping. In contrast, higher viscosity motor oils will results in larger ratios of touch perturbations 1390 and 1380.

In some embodiments, the touch sensor may include a phase sensitive controller configured to fully capture the information in the signal resulting from interfering SAW-S7-SAW and SAW-A7-SAW components of the return signal being that may well not be in phase. The phase sensitive controller may be configured to measure touch perturbations as changes in complex received amplitudes of the form:

$$|amplitude|*e^{i*phase} \qquad \text{Equation 12}$$

This is in contrast to conventional measurement of touch perturbations as changes in the absolute magnitude (or envelope) of the received signal. Additional details regarding phase sensitive controllers, applicable to some embodiments, are discussed in U.S. Pat. No. 7,683,894, titled "Acoustic Condition Sensor Employing a Plurality of Mutually Non-orthogonal Waves," which is incorporated by reference in its entirety herein.

Curved Profile Touch Sensors

In some embodiments, the touch sensor may have a curved or otherwise non-linear profile. FIG. 14 shows a plan view of front surface 1420 of substrate 1405 for touch sensor 1400, configured in accordance with some embodiments. As shown, substrate 1405 may have an arbitrary shape 1402 in plan view so long as shape 1402 encloses the acoustically active area including the transducers 1410a-1410d, reflective arrays 1415A-1415d and acoustic paths segments (e.g., path segments 1440, 1450 and 1460). Path segments 1440, 1450 and 1460 may correspond in function to path segments 140, 150 and 160 of FIGS. 2A and 2B. Virtually any other shapes are possible in various embodiments, such as a heart shape, a circle, a butterfly outline, etc., thus providing many options for artistic industrial design.

Furthermore, as illustrated by graphic items 1480a, 1480b and 1480c, decals, paint and all sorts to cosmetic additions can be added to the substrate at areas outside the acoustically active area with no effect on touchscreen function. In some embodiments, material may also be added over the reflective arrays, which may be less sensitive than touch region 1405 to the added material, as shown by graphic item 1482. As such, one or more graphics may be added outside of touch region 1405.

Bezel-Less XYU Sensors Using Lamb Waves

In some embodiments, touches may be sensed not only by Lamb waves propagating in the X and Y directions in the touch region (e.g., as shown in FIGS. 2A and 2B), but also by Lamb waves propagating in a diagonal "U" direction. XYU touch sensors may provide benefits for multi-touch operation, for example, by enabling confirmation of proper association of an X touch shadow and a Y touch shadow via checking for the existence of a shadow in the U beams at a U(X,Y) coordinate predicted by the X and Y coordinates. U.S. Pat. No. 5,854,450, incorporated by reference above, and U.S. Pat. No. 8,243,048, titled "Touchscreen for Detecting Multiple Touches," incorporated by reference in its entirety herein, show example XYU SAW-SAW-SAW sensors. However, SAW-SAW-SAW bezel-less designs (e.g., using precisely curved connecting surfaces that propagate surface acoustic waves) typically do not take advantage of XYU sensing due to incompatibility between bezel-less and XYU technologies (e.g., the difficulty in avoiding U coordinate dead zones). As explained below, SAW-LAMB-SAW sensors may allow for bezel-less XYU touch sensors.

FIG. 15A shows a plan view of back surface 1525 of substrate 1505 for XYU touch sensor 1500, configured in accordance with some embodiments. The description above of transducers 110a, 110b, 110c and 110d of FIG. 2B may also apply to transducers 1510a, 1510b, 1510c and 1510d of FIG. 15A. Similarly, the descriptions above of substrate 105 and reflective arrays 115A, 115B, 115C, and 115d may also apply to substrate 1505 and reflective arrays 1515A, 1515B, 1515d and 1515d, respectively. Furthermore the description and function of path segments 140, 150 and 160 may correspond to those of path segments 1540, 1550 and 1560.

Touch sensor 1500 may also include transmitting transducers 1512A and 1512d, receiving transducers 1512B and 1512C, reflective arrays 1517A, 1517B, 1517c and 1517d for determining U coordinates of touches. For example, transmitting transducer 1512A may be configured to generate a surface acoustic wave along path segment 1542, which via reflective array 1517A is scattered and mode converted to a Lamb wave propagating along path segment 1552, which in turn via reflective array 1517c is mode converted back to a surface acoustic wave propagating along path segment 1562 to receiving transducer 1512C. Acoustic paths from transmitting transducer 1512A to receiving transducer 1512C, may cover the half of the touch region below diagonal 1530. U coordinate measurement for the other half of the touch area above diagonal 1350 may be provided by acoustic paths from transmitting transducer 1512d, along reflective array 1517d, across the touch region, and along reflective array 1517B to receiving transducer 1512B. As such, the entire touch region may be provided with U coordinate measurement in addition to X and Y coordinate measurements of touches, providing touch sensor 1500 with enhanced multi-touch capabilities relative to touch sensor 100.

In some embodiments, reflective arrays 1517A, 1517B, 1517c and 1517d may include reflector elements having reflector angles θ and reflector spacing S (e.g., between two reflector elements) to support coherent scattering at a desired scattering angle Φ (e.g., including, but not necessarily, at 90°). FIGS. 15B and 15C shows coherent scattering conditions for reflector angles θ and spacing s, respectively, for reflective array 1517c; similar principles may apply to reflective arrays 1517A, 1517B and 1517d.

As shown in FIG. 15B, reflector element 1580 may form reflector angle θ with respect to the axis of reflective array 1517c, or equivalently makes an angle θ with respect to the desired propagation direction of path segment 1562, for which rays 1562A and 1562B are shown in FIG. 15B. Reflector angle θ may be chosen to support coherent scattering of Lamb waves propagating along path segment 1552, for which rays 1552A and 1552B are shown in FIG. 15B, into SAW along acoustic path segment 1562. Desired scattering angle Φ may be defined as the angle between acoustic path segment 1552 and 1562. As such, reflector element 1580 and the direction of acoustic path segment 1552 may form an angle of (θ−Φ). Lamb rays 1552A and 1552B may arrive at the same phase at the Lamb wave front 1595. Ray 1552A may scatter off the near end of reflector 1580, while ray 1552B is followed by an addition propagation of Lamb waves along ray 1585 to reach the far end of reflector 1580. The length of ray 1585 may be given by:

$$L \cdot \cos(\theta - \Phi)$$

where L is the length of reflector 1580. In units of cycles, this corresponds to a phase delay of $L \cdot \cos(\theta - \Phi)/\lambda_{LAMB}$, where $\lambda_{LAMB}$ is the wavelength of the Lamb wave propagating along acoustic path segment 1552. SAW rays 1562A and 1562B are shown as beginning at a common SAW front 1596 which may be aligned with the end of reflector 1580. Between the near end of reflector 1580 and the beginning of SAW ray 1562A is the SAW ray 1586 with length $L \cdot \cos(\theta)$ and corresponding phase delay of $L \cdot \cos(\theta)/\lambda_{SAW}$, where $\lambda_{SAW}$ is the SAW wavelength. The condition that reflector angle θ provides coherent scattering may be satisfied when phase delays from rays 1585 and 1586 are equal as expressed mathematically as (where the reflector length L drops out):

$$\cos(\theta)/\lambda_{SAW} = \cos(\theta - \Phi)/\lambda_L \qquad \text{Equation 13.}$$

Dividing both sides of Equation 13 by the operating frequency f gives the following equivalent form of the coherent scattering condition for the reflector angle θ in terms of SAW and Lamb phase velocities $V_{SAW}$ and $V_P$, respectively:

$$\cos(\theta)/\lambda_{SAW} = \cos(\theta-\Phi)/V_P \quad \text{Equation 14.}$$

Equations 13 and 14 may be applicable not only to XYU sensor embodiments, but also to other touch sensor embodiments using any desired scattering angle Φ. For example, where desired scattering angle Φ is 90°, Equations 13 and 14 reduces to the same result as that given by Equation 1 above.

FIG. 15C shows an example reflector spacing S (e.g., between two reflector elements in a reflective array) for reflective array 1517c, in accordance with some embodiments. As shown, Lamb waves may propagate in the direction of path segment 1572, as represented by rays 1572A and 1572B. Rays 1572A and 1572B may be mode converted to SAW scattered by a scattering angle Φ by reflective array 1517c, of which reflector elements 1580 and 1581 are shown. Reflector spacing S may represent a distance between reflectors 1580 and 1581 in the direction of the axis of reflective array 1517c. Equivalently, reflector spacing S may represent the length of the SAW ray 1582 between the near end of reflector 1580 and reflector 1581. The length of Lamb ray 1584 from Lamb wave front 1592 to the near end of reflector 1581 may be given by S·cos(Φ) corresponding to a phase delay in units of cycles of S·cos(Φ)/$\lambda_L$. The SAW ray 1582 corresponds to a phase delay of S/$\lambda_{SAW}$. Coherence does not necessarily require that these phase delays are the same, but only that they be different by an integer n number of cycles, resulting in the spacing coherence condition given by:

$$S/\lambda_{SAW} - S\cdot\cos(\Phi)/\lambda_L = n \quad \text{Equation 15,}$$

where n is a positive integer. Equation 15 (e.g., the spacing coherence condition) may also be re-expressed as:

$$S = n\cdot\lambda_{SAW}/(1-(\lambda_{SAW}/\lambda_L)\cdot\cos(\Phi)) \quad \text{Equation 16, or}$$

$$S = n\cdot(V_{SAW}/f)/(1-(V_{SAW}/V_P)^*\cos(\Phi)) \quad \text{Equation 17,}$$

where n is a positive integer.

Equations 15, 16 and 17 may be applicable not only to XYU sensor embodiments, but also to other touch sensor embodiments using any desired scattering angle Φ. For example, where desired scattering angle Φ is 90°, Equations 15, 16 and 17 reduce to:

$$S = n\cdot\lambda_{SAW} = n\cdot(V_{SAW}/f) \quad \text{Equation 18.}$$

Mounting material 1530 may be placed around the perimeter of substrate 1505 to provide support as well as sealing the transducers and reflective arrays from the external environment.

FIG. 16A shows a plan view of the back surface 1625 a substrate 1605 of an XYU touch sensor 1600, in accordance with some embodiments. A touch sensor may include one or more beam splitters 1627, such as beam splitter 1627a, 1627b, 1627c, and 1627d as shown in FIG. 16. In some embodiments, beam splitters 1627 may be similar to those described in U.S. Pat. No. 8,243,048, incorporated by reference above. Touch sensor 1600 may not include transducers 1512A, 1512B, 1512C, and 1512d or reflective arrays 1517A, 1517B, 1517c, and 1517d (as shown in FIG. 15A for touch sensor 1500). Beam splitters 1627a, 1627b, 1627c and 1627d may be configured to support U coordinate measuring acoustic paths. For example, a surface acoustic wave from transmitting transducer 1610a may propagate along path segment 1643, where it may be mode converted to a Lamb wave and scattered at 90° by reflectors elements of reflective array 1615A into path segment 1644. A portion of the energy of the Lamb wave propagating along acoustic path segment 1644 may continue along path segment 1645 and eventually reaches receiving transducer 1610b, providing a signal for X coordinate measurement. Another portion of the Lamb wave propagating along path segment 1644 may be coherently scattered and redirected along path segment 1646 by the beam splitter elements of beam splitter 1627a. Beam splitter 1627c may then scatter and redirect the Lamb wave propagating along acoustic path segment 1646 into the path segment 1647, which in turn may be mode converted to surface acoustic wave and scattered by reflector array 1615C to receiving transducer 1610c along path segment 1648. Paths segments 1643, 1644, 1646, 1646 and 1648 between transducers 1610a to 1610c may provide for U coordinate measurement over half the touch region (e.g., as shown by diagonal 1530 for touch sensor 1500 in FIG. 15A).

U coordinate measurement for the other half of the touch region may be provided by acoustic paths between transmitting transducer 1610d and receiving transducer 1610b that include beam splitters 1627d and 1627b. Mounting material 1630 may be placed around the perimeter of substrate 1605 to provide support as well as sealing the transducers and reflective arrays from the external environment. The transducers, beam splitters and reflective arrays may be placed on the back surface 1626 of substrate 1605 and not on the front surface. As such, touch sensor 1600 may be utilized in a bezel-less touch sensor. In some embodiments, an acoustically benign coating and/or acoustically beneficial coating may be added between substrate 1605 and the transducers 1610, beam splitters 1627, and reflective arrays 1615.

FIG. 16B shows a plan view of back surface 1625 of XYU touch sensor 1655, configured in accordance with some embodiments. Touch sensor 1655 may be another example of a SAW-Lamb-SAW sensor that includes bezel-less XYU sensing. In some embodiments, U touch coordinate measurement may be provided by transducers 1612A, 1612B, 1612C and 1612d and reflective arrays 1617A, 1617B, 1617c and 1617d via acoustic paths such as that show with path segments 1642, 1652 and 1662 in a manner described for U touch coordinate determination with respect to touch sensor 1500. In touch sensor 1655, these components may provide for a SAW-LAMB-SAW sub-system for U measurement. Touch sensor 1655 may also provide for X and Y coordinates with a SAW-SAW-SAW sub-system that uses precisely rounded connecting surfaces for surface acoustic wave propagation. In particular, for X coordinate measurement, SAW path segment 1640 from transmitting transducer 1610a may be scattered at 90° by reflective array 1615A into SAW path segment 1650 that travels down toward the bottom edge of substrate 1605, around a curved connecting surface to the front surface, travels up across the touch region, around another curved connecting surface to the back surface, down to reflective array 1615B, and scattered again at 90° by reflective array 1615B along SAW path segment 1660 to receiving transducer 1610b. For Y coordinate measurement, similar functions may be provided by transducers 1610c and 1610d and reflective arrays 1615C and 1615d. In some embodiments, mounting material 1630 may be placed between SAW-LAMB-SAW reflective arrays 1617A-1617c and SAW-SAW-SAW reflective arrays 1615A-1615C. With the combination of both the SAW-LAMB-SAW sub-system and the SAW-SAW-SAW sub-system, X, Y and U coordinate measurements may be determined.

In some embodiments, touch sensor 1655 may be configured to provide nature of touch information and/or redundant touch location determination using the detection of two touch types from each of the SAW-LAMB-SAW sub-system and the SAW-SAW-SAW sub-system. For example, a touch in the touch region may be sensed (e.g., simultaneously) by more than one type of wave, namely a high-sensitivity Lamb wave and a surface acoustic wave.

Touch Sensor Coversheet

In some embodiments, a touch sensor may include a cover sheet. The coversheet may provide various benefits including response to any stylus and touch operation immunity to water and other contaminants. FIG. 17A shows a plan view of front surface 1720 of substrate 1705 of touch sensor 1700, configured in accordance with some embodiments.

As shown, adhesive bonding material 1730 may be disposed around the perimeter of front surface 1720 of touch sensor 1700. Adhesive bonding material 1725 may have no effect on the desired received signals as it is located away from the acoustically active portions of touch sensor 1700. Adhesive bonding material 1625 may be used to adhere, i.e., attach, a coversheet 1740, as is shown in FIG. 17B.

FIG. 17B shows touch sensor 1700 along cross-section BB, as illustrated in FIG. 17A, and including coversheet 1740. In some embodiments, coversheet 1740 may include opaque coating 1730 around its perimeter in order to hide transducers 1710a-1710d and reflective arrays 1715A-1715d (shown in FIG. 17A in outline as being on the back surface of substrate 1705, but not in FIG. 17B) in a cosmetically appealing way. Touches may contact the top surface of coversheet 1740 causing it to deflect so that the bottom surface of coversheet 1740 makes strong mechanical and acoustic contact with top surface 1720 of substrate 1705. Contact between coversheet 1740 substrate 1705 may cause similar Lamb wave attenuation as direct (e.g., finger, stylus, etc.) touch on front surface 1720 of substrate 1705.

In some embodiments, coversheet 1740 may include a layered structure to enhance touch sensitivity and increase robustness. An exterior layer (e.g., at the top of coversheet 1740) may be a scratch and wear resistant hardcoat. A load spreading layer (e.g., structural layer of PET (polyethylene terephthalate)) may be disposed under the exterior layer. Under the relatively stiff load spreading layer may be a soft elastomer layer to provide conformability and hence good acoustic contact between coversheet 1740 and substrate 1705 at a touch location. In some embodiments, an additional non-stick layer (e.g., of hard, non-tacky polymer) may be added at the bottom of coversheet 1740 to avoid sticking. More details regarding coversheets applicable to some embodiments are discussed in U.S. Patent Application Publication No. 2011/0291996, titled "Multi-layer Coversheet for SAW Touch Panel," which is incorporated by reference in its entirety herein.

Lamb Sensors without Reflective Arrays

In some embodiments, a touch sensor using one or more of the Lamb waves discussed herein may not include any reflective arrays. FIG. 18 shows an example back surface 1825 of substrate 1805 of touch sensor 1800 that is bezel-less with nothing on the front surface of substrate 1805. For example, transducers 1820, 1830 and 1840 may be all located on back surface 1825 of substrate 1805. Transducers 1820 may be transmitting transducers that emit high-sensitivity Lamb waves. For example, high-sensitivity Lamb waves may leave a transmitting transducer 1820 and propagate along path 1850 until it is received by a receiving transducer 1830. As such, signals generated by transmitting transducers 1820 and received by receiving transducers 1830 may provide Y-coordinate data for touch events. X-coordinate data may be provided by transducers 1840. Transducers 1840 may be configured to both transmit and receive high-sensitivity Lamb waves. For example, Lamb waves generated by a transducer 1840 may propagate along path segment 1860, be reflected by edge 1880 of substrate 1805, propagate along path segment 1862, and be received by the same transducer 1840 that generated the Lamb waves.

For clarity, transducers 1820, 1830 and 1840 are shown in FIG. 18 as well separated and relatively wide transducers. However, in some embodiments, it may be desirable to minimize gaps between the transducers and to provide for a larger number of narrower transducers in order to eliminate dead zones between the transducers and to increase resolution. In some embodiments, measurement of signals corresponding to cross beams such as acoustic path 1852 (illustrated as a dotted line) may also provide improved resolution.

In various embodiments, transducers 1820, 1830 and 1840, as well as the other transducers discussed herein, may be wedge transducers, interdigital transducers, or any other type of transducer capable of generating and/or received the desired wave modes.

In some embodiments, Lamb wave reflection by a substrate edge (e.g., edge 1880 shown in FIG. 18), may also be used in touch sensors including reflective arrays, such as in a SAW-Lamb-SAW touch sensor or a Lamé-Lamé-Lamé touch sensor as discussed herein.

Large Area Lamé-Lamé-Lamé Touch Sensors

FIG. 19 shows an example back surface 1925 of a substrate 1905 for large area Lamé-Lamé-Lamé touch sensor 1900, in accordance with some embodiments. As discussed above, some desired Lamé wave modes may utilize a smaller substrate thickness d (e.g., for a given operating frequency j), and therefore could be leveraged to provide thinner touch sensors. For a given substrate thickness d, by enabling use of lower operating frequencies f (e.g., than would be available for SAW-SAW-SAW touch sensors), and hence lower wave attenuation rates, near-Lamé waves may support larger touch surface sizes (e.g., than surface acoustic waves).

As shown in FIG. 19, an acoustic path including acoustic path segments 1940, 1950 and 1960 provide a signal from transducer 1910a to transducer 1910b via reflective arrays 1915A and 1915B. Like the other figures discussed herein, FIG. 19 is not necessarily drawn to scale, and with exaggerated transducer sizes and reflective array widths for clarity. Path segments 1940, 1950 and 1960 may be near-Lamé waves, thereby making touch sensor 1900 a Lamé-Lamé-Lamé touch sensor.

In one example, substrate 1905 of touch sensor 1900 may have a thickness d of 2 mm and may be composed of a glass with low acoustic attenuation. Examples of suitable low acoustic loss substrates, applicable to various embodiments, are described in U.S. Pat. Nos. 5,708,461, 6,236,391 and 6,441,809, each titled "Acoustic Touch Position Sensor Using a Low-loss Transparent Substrate," and each hereby incorporated by reference in their entirety. Furthermore, operating frequency f may be chosen to support an S0/Lamé mode in a substrate of this material and thickness (e.g. as discussed above in connection with FIGS. 9A-11). The resulting operating frequency f may be about 1.2 MHz. Such a 2 mm thick substrate would only support surface acoustic wave propagation at operating frequencies of about 5 MHz or higher, so use of the S0/Lamé mode enables a lower operating frequency f by about a factor of four (e.g., 1.2 MHz versus 5 MHz).

If frequency dependence of viscosity is neglected, then wave attenuation rates may approximately scale as the square of operating frequency f, implying that a factor four drop in operating frequency f gives a factor 16 drop in attenuation, a factor of 16 increase in maximum possible acoustic path distance, and hence a factor 16 increase in maximum touchscreen size. Accounting for frequency dependent glass viscosity (e.g., decreasing with increasing operating frequency f for most suitable substrates), attenuation typically scales faster than linearly with frequency f but slower than the square of frequency f. As such, the advantage of S0/Lamé to operate at a factor of four lower frequency f than surface acoustic wave (e.g., for the same substrate thickness d) enables an increase in maximum touchscreen size relative to SAW by a factor about between 4 and 16.

In some embodiments, even larger touch sensors may be possible with the addition of additional transducers and/or reflective arrays. Touch sensor design that may be applicable in some embodiments (e.g., including eight transducer designs), are discussed in greater detail in U.S. Pat. No. 5,854,450, incorporated by reference above.

In some embodiments, a substrate (e.g., substrate 1905 or any of the other substrates discussed herein) may be made of aluminum. Acoustic attenuation in aluminum may be similar to that of low-loss glasses. Hence embodiments of touch sensor 1900 in which substrate 1905 is composed of aluminum may also support large touch sensor sizes (e.g., least 100 inches (2½ meters) diagonally in some embodiments).

In some embodiments, a thin white acoustically benign coating may be disposed on the front surface of aluminum substrate 1905. The coating may provide a touch region that serves as an electronic whiteboard, a projection screen which users can touch to interact with the displayed image, or the like.

In some embodiments, substrate 1905 (e.g., whether aluminum, glass, or otherwise) may be cylindrically curved about a vertical axis so that left edge 1970 is brought into contact to right edge 1972, resulting in a cylindrical shell with reflective arrays 1915 and transducers 1910 inside the cylindrical shell and the touch surface on the exterior of the cylindrical shell. In some embodiments, left edge 1970 and right edge 1972 may be welded or otherwise attached such that the cylindrical touch surface is smooth and uninterrupted.

A cylindrical shell is just one of many possible geometrical touch sensor configurations. Other example, but non-exhaustive, touch sensor geometries that may be used with the Lamb waves discussed herein are shown in U.S. Pat. No. 5,854,450, incorporated by reference above. Non-planar geometries may have application in robotics where touch and collision detection on exterior robot surfaces may be desirable. Furthermore, the techniques discussed herein may be leveraged in creating interactive environments in which normally passive surfaces such as table tops and wall surfaces become touch sensitive surfaces and are not limited to touch sensors placed in front of displays.

Detecting Touch Coordinates

FIG. 20 shows an example of a method 2000 for determining a touch coordinate of a touch event, performed in accordance with some embodiments. The touch coordinate may at least partially represent a touch location. For example, the touch coordinate may be an X-coordinate or a Y-coordinate in a X-Y axis system of touch locations. As such, method 2000 may be performed for each touch coordinate that represents a touch location (e.g., including for three touch coordinates in an XYU sensor).

In some embodiments, method 2000 may be performed by touch controller 315. For clarity, method 2000 is described with reference to touch sensor 100 shown in FIGS. 2A and 2B, although other touch sensors may be used. For example, touch sensor 100 is a SAW-LAMB-SAW touch sensor, although the techniques described herein may be applicable to LAME-LAME-LAME touch sensors or touch sensors without reflective arrays). Method 2000 may start at 2002 and proceed to 2004, where circuitry may be configured to generate an electrical excitation signal. The electrical excitation signal, or excitation signal as also used herein, may be a sinusoidal wave or a pseudo sinusoidal wave tone burst at a desired operating frequency f.

In some embodiments, the operating frequency f may be selected to support near-longitudinal-resonance Lamb waves (e.g., or near-Lamé waves for a LAME-LAME-LAME touch sensor) or other high-sensitivity Lamb wave suitable for touch sensing. For example, the properties of the substrate material (e.g., Poisson's ration, $V_{SAW}$, $V_{SHEAR}$, $V_{LONG}$, etc.) may be determined. The thickness d of the substrate may be determined, cut, or otherwise manufactured. Based on the thickness d and the substrate material, the relationship between Lamb wave phase velocity $V_p$ and frequency f may be determined (e.g., as shown in FIG. 4). The operating frequency f may be selected such that: $(m/2) \cdot V_{LONG}/f = (m/2) \cdot \lambda_{LONG} <$ thickness $d \leq (5/4) \cdot (m/2) \cdot \lambda_{LONG}$, where m=1, 2, 3, etc., and with phase velocity $V_p$ greater than three times the SAW velocity $V_{SAW}$. In another example, the operating frequency f may be first prior to the substrate thickness d, with substrate thickness d and/or the substrate material properties selected accordingly.

In some embodiments, the operating frequency f may have a frequency spread $\Delta f$ which can result in unwanted dispersion. As such, generating the electrical excitation signal may include anti-dispersing the electrical excitation signal with a frequency dependent phase error (e.g., $\delta\phi(\omega)$) before sending the electrical excitation signal to a transmitting transducer, where the frequency dependent phase error may be configured to compensate for dispersion of the acoustic wave (e.g., of near-longitudinal-resonance Lamb waves caused by propagation through the substrate with the frequency spread $\Delta f$).

In some embodiments, the operating frequency f may be selected for low dispersion. For example, generating the operating frequency f may include generating the operating frequency f such that the group velocity $V^G_{Lamb}$ has a low operating frequency dependence and/or where operating frequency f is near an inflection point of the group velocity $V^G_{Lamb}$ as a function of varying operating frequencies, as discussed above in connecting with FIG. 7. Group velocity $V^G_{Lamb}$ may have a dependence on operating frequency f and thickness d, and as such, some embodiments may include selecting thickness d for low dispersion (e.g., without modifying operating frequency f). Additionally and/or alternatively, both operating frequency f and thickness d could be selected to propagate Lamb waves with low dispersion in addition to high sensitivity.

In some embodiments, the operating frequency f and/or thickness d can also be selected to facilitate redundant touch sensing and/or nature of touch determination (e.g., using near-shear-resonance and near-longitudinal-resonance Lamb waves), as discussed above in connection with FIGS. 13A-13B.

At 2006, the circuitry may be configured to transmit the electrical excitation signal to a transmitting transducer that is configured to transform the electrical excitation signal in an acoustic wave. As discussed above, the acoustic wave may vary depending on the type of touch sensor being used. If the sensor is a SAW-LAMB-SAW sensor, for example, then the acoustic wave may be surface acoustic wave. Similarly, if the sensor is LAME-LAME-LAME, then the acoustic wave may be a near-Lamé wave. In some embodiments, the acoustic wave may have the operating frequency f and the frequency spread Δf of the electrical excitation signal.

With reference to FIG. 2B, the transmitting transducer may be transducer 110a at back surface 125 of substrate 105. The acoustic wave may traverse acoustic path segment 140 as a surface acoustic wave, path segment 150 as a Lamb wave (e.g., via a mode conversion array 115A) and path segment 160 as a surface acoustic wave (e.g., via mode conversion array 115B), where it is received by transducer 110b at back surface 125.

At 2008, the circuitry may be configured to receive an electrical return signal from a receiving transducer (e.g., transducer 110b) that is configured to transform the acoustic wave into the electrical return signal. The electrical return signal may represent the acoustic wave subsequent to its propagation through the sensor. Thus, an attenuation in the acoustic wave, as may be caused by a touch event (e.g., in touch region 205 of front surface 120 of substrate 105 as shown in FIG. 2A) that occurred while the acoustic wave propagated through the sensor along path segment 150, may cause a corresponding attenuation in the electrical returned signal. As discussed above, a near-longitudinal-resonance Lamb wave, near-Lamé wave, or some other suitable high sensitivity Lamb wave may propagate along path segment 150.

At 2010, the circuitry may be configured to process the electrical return signal. Processing the electric return signal may include determining the location of the touch (e.g., a touch coordinate of the touch location) based on the electrical return signal. For example, the touch coordinate may partially represent (i.e., along one sensing axis) a physical location on the touch sensor where the attenuation occurred. The touch coordinate may be determined based on the timing of the attenuation in the electrical return signal. Details regarding techniques for determining touch coordinates based on the electrical return signal are discussed in greater detail in U.S. Provisional Patent Application No. 61/714,187, incorporated by reference above, and U.S. patent application Ser. No. 13/682,621, titled "Segmented Waveguide Core Touch sensor Systems and Methods," which is hereby incorporated by reference in its entirety.

In some embodiments, processing the electrical return signal may include anti-dispersing the electrical return signal before determining the location of the touch. For example, anti-dispersing the electrical return signal may be performed if anti-dispersing was not performed on the electrical excitation signal at 2004. As discussed above, this approach may use electronics that digitize not only the magnitude of the electrical return signal, but also digitizes its phase. Method 2000 may then end at 2012.

Touch Controller Electronics

FIG. 21 shows a block diagram of an example control system 2100 for a touch sensor, configured in accordance with some embodiments. Control system 2100 may include touch controller 2102, main controller 2104, transducers 2110 and display device 2130.

Touch controller 2102 may include one or more processors 2102A configured to execute firmware and/or software programs stored in one or more memory devices 2102B to perform the functionality described herein. For example, touch controller 2102 may be coupled via wires, leads, and/or by any other suitable manner to transducers 2110 to control the transmission (e.g., at a desired operating frequency f) and reception of acoustic waves. Touch controller 2102 may further be configured to determine touch locations, anti-disperse signals, etc.

In some embodiments, touch controller 2102 may be configured to interface with a computer system, such as a personal computer, embedded system, kiosk, user terminal, and/or other machine as a human-to-machine interface device. The computer system may include main controller 2104 with one or more processors 2104a configured to execute firmware and/or software programs stored in one or more memory devices 2104b. Main controller 2104 may generate a visual component (and/or display element) that is sent to display device 2130 for display. The visual component may include or comprise a user interface that is operable using the touch sensor.

The computing system may further include other display devices, audio input and/or output capability, keyboard, electronic camera, other pointing input device, or the like (not shown). The computer system may operate using custom software, but more typically may use a standard and/or other type of operating system. In examples where the computing system is configured to enable use of other user input devices, the touch sensor may be employed as a primary or secondary input device.

Main controller 2104 may be communicatively connected with touch controller 2102. In some embodiments, touch locations may and/or other position information may be sent from touch controller 2102 to main controller 2104, allowing a user to interact with a program executing on main controller 2104 via the touch sensor. In some embodiments, touch controller 2102 may be further configured to map the touch coordinates to appropriate control actions that are sent to main controller 2104. For example, a multi-dimensional dataset (such as a two dimensional table) may be used to associate timing information of an acoustic wave attenuation with one or more coordinates representing a physical location of the sensor. In some embodiments, touch controller 2102 may transmit touch coordinates (e.g., XY or XYU) to main controller 2104.

While FIG. 21 shows touch controller 2102 as a separate device from main controller 2104, in some embodiments, a single controller may be configured to perform all of the functions described herein. For example, touch controller 2102 and main controller 2104 may be integrated in an embedded system in some embodiments.

In some embodiments, each processing/controlling component (e.g., processor 2102A and/or processor 2104a) of control system 2100 may be embodied as, for example, circuitry or other type of hardware elements (e.g., a suitably programmed processor, combinational logic circuit, and/or the like). The processing/controlling components may be configured by a computer program product comprising computer-readable program instructions stored on a non-transitory computer-readable medium (e.g., memory 2102B and/or memory 2104b) that is executable by a suitably configured processing, or some combination thereof.

Processor 2102A and/or processor 2104a may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 21 as single processors, processor 2101a and/or processor 2104a may comprise a plurality of processors in some embodiments. The plurality of processors may be embodied on a single computing device or may be distributed across a plurality of computing devices collectively configured to function as a processing module of control system 2100. The plurality of processors may be in operative communication with each other and may be collectively configured to perform one or more functionalities of control system 2100 as described herein.

Whether configured by hardware, firmware/software methods, or by a combination thereof, processor 2102A and/or processor 2104a may comprise an entity capable of performing operations according to various embodiments while configured accordingly. Thus, for example, when processor 2102A and/or processor 2104a are embodied as an ASIC, FPGA or the like, processor 2102A and/or processor 2104a may comprise specifically configured hardware for conducting one or more operations described herein. Alternatively, as another example, when processor 2102A and/or processor 2104a are embodied as an executor of instructions, such as may be stored in memory 2102B and/or memory 2104a, the instructions may specifically configure processor 2102A and/or processor 2104a to perform one or more algorithms and/or operations described herein.

Memory 2102B and/or memory 2104b may comprise, for example, volatile memory, non-volatile memory, or some combination thereof. Although illustrated in FIG. 21 as single memory components, memory 2102B and/or memory 2104b may comprise a plurality of memory components. The plurality of memory components may be embodied on a single computing device or distributed across a plurality of computing devices. In various embodiments, memory 2102B and/or memory 2104b may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 2102B and/or memory 2104b may be configured to store information, data, applications, instructions, or the like for enabling control system 2100 to carry out various functions in accordance with some embodiments. For example, in at least some embodiments, memory 2102B and/or memory 2104b may be configured to buffer input data for processing by processor 2102A and/or processor 2104a. Additionally or alternatively, in at least some embodiments, memory 2102B and/or memory 2104b may be configured to store program instructions for execution by processor 2102A and/or processor 2104a. Memory 2102B and/or memory 2104b may store information in the form of static and/or dynamic information. This stored information may be stored and/or used by control system 2100 during the course of performing its functionalities.

Embodiments have been described above with reference to a block diagram of circuitry and example process flowcharts describing functionality that may be implemented by one or more components of circuitry, such as those discussed above in connection with control system 2100 in combination with a touch sensor. Each block of the circuit diagrams and process flowchart, and combinations of blocks in the circuit diagrams and process flowchart, respectively, may be implemented by various means including computer program instructions. These computer program instructions may be loaded onto a general purpose computer, special purpose computer, or other programmable data processing apparatus, such as processor 2102A and/or processor 2104a, to produce a machine, such that the computer program product includes the instructions which execute on the computer or other programmable data processing apparatus create a means for implementing the functions specified in the flowchart block or blocks.

These computer program instructions may also be stored in a computer-readable storage device (e.g., memory 2102B and/or memory 2104b) that may direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, may be implemented by special purpose hardware-based computer systems that perform the specified functions or steps, or combinations of special purpose hardware and computer instructions.

Conclusion

Many modifications of the embodiments set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:
1. A touch controller comprising:
circuitry having operating frequency characteristics, including an operating frequency f and a frequency spread $\Delta f$, wherein the operating frequency characteristics are selected to minimize effects of dispersion of acoustic wave propagation, and wherein selecting operating frequency characteristics comprises selecting an operating frequency f near an inflection point of a group velocity $V^G_{Lamb}$ of a substrate through which the acoustic waves are propagating;

circuitry configured to generate an anti-dispersed excitation signal; and circuitry configured to provide the anti-dispersed excitation signal to a transmitting transducer.

2. The touch controller of claim 1, further comprising a digital-to-analog converter (DAC) for aiding in generation of the anti-dispersed excitation signal.

3. The touch controller of claim 2, wherein the digital-to-analog converter (DAC) comprises a conversion rate higher than four times the operating frequency f.

4. The touch controller of claim 1, wherein the acoustic waves comprise Lamb waves.

5. The touch controller of claim 4, wherein the Lamb waves comprise one or more of near-longitudinal-resonance Lamb waves or near Lame waves.

6. The touch controller of claim 1, further configured to select an operating frequency such that the group velocity $V^G_{Lamb}$ of a substrate through which acoustic waves are propagated has a low frequency dependence within the frequency spread $\Delta f$.

7. The touch controller of claim 6, wherein the acoustic waves comprise Lamb waves.

8. The touch controller of claim 7, wherein the Lamb waves comprise one or more of near-longitudinal-resonance Lamb waves or near Lame waves.

9. The touch controller of claim 1, wherein anti-dispersion of an excitation signal is based in part on dispersive phase errors.

10. A method, comprising:

selecting operating frequency characteristics relative to a frequency dependence of a group velocity of propagating acoustic waves, the operating frequency characteristics selected to minimize effects of dispersion of acoustic wave propagation, wherein selecting operating frequency characteristics comprises selecting an operating frequency f near an inflection point of a group velocity $V^G_{Lamb}$ of a substrate through which the acoustic waves are propagating;

performing touch controller operations with the operating frequency characteristics, the operating frequency characteristics including an operating frequency f, and a frequency spread $\Delta f$ around the operating frequency f;

generating an anti-dispersed excitation signal; and sending the anti-dispersed excitation signal to a transmitting transducer.

11. The method of claim 10, further comprising converting from digital to analog a magnitude and a phase of a signal.

12. The method of claim 11, further comprising utilizing a conversion rate higher than four times the operating frequency f for the converting from digital to analog.

13. The method of claim 10, wherein the acoustic waves comprise Lamb waves.

14. The method of claim 13, wherein the Lamb waves comprise one or more of near-longitudinal-resonance Lamb waves or near Lame waves.

15. The method of claim 10, further comprising selecting an operating frequency f such that the group velocity $V^G_{Lamb}$ of a substrate through which acoustic waves are propagating has a low frequency dependence within the frequency spread $\Delta f$.

16. The method of claim 15, wherein the acoustic waves comprise Lamb waves.

17. The method of claim 16, wherein the Lamb waves comprise one or more of near-longitudinal-resonance Lamb waves or near Lame waves.

18. The method of claim 10, wherein anti-dispersion of the excitation signal is based in part on a time-delay dependent and frequency dependent phase error.

19. A touch controller comprising:

circuitry having operating frequency characteristics, including an operating frequency f and a frequency spread $\Delta f$, wherein the operating frequency characteristics are selected to minimize effects of dispersion of acoustic wave propagation, and wherein selecting operating frequency characteristics comprises selecting an operating frequency f such that the group velocity $V^G_{Lamb}$ of a substrate through which the acoustic waves are propagating has a low frequency dependence within the frequency spread $\Delta f$, circuitry configured to generate an anti-dispersed excitation signal; and circuitry configured to provide the anti-dispersed excitation signal to a transmitting transducer.

20. A method, comprising:

selecting operating frequency characteristics relative to a frequency dependence of a group velocity of propagating acoustic waves, the operating frequency characteristics selected to minimize effects of dispersion of acoustic wave propagation, wherein selecting operating frequency characteristics comprises selecting an operating frequency f such that the group velocity $V^G_{Lamb}$ of a substrate through which the acoustic waves are propagating has a low frequency dependence within the frequency spread $\Delta f$, performing touch controller operations with the operating frequency characteristics, the operating frequency characteristics including an operating frequency f, and a frequency spread $\Delta f$ around the operating frequency f, generating an anti-dispersed excitation signal; and sending the anti-dispersed excitation signal to a transmitting transducer.

* * * * *